US009776576B1

(12) United States Patent
McDermott et al.

(10) Patent No.: US 9,776,576 B1
(45) Date of Patent: Oct. 3, 2017

(54) HAMMOCK AND CHAIR SUPPORT SYSTEMS

(71) Applicant: King's Pond Enterprises, LLC, West Jordan, UT (US)

(72) Inventors: Scott D. McDermott, Cottonwood Heights, UT (US); Robert D. McDermott, Sandy, UT (US)

(*) Notice: Subject to any disclaimer, the term of this patent is extended or adjusted under 35 U.S.C. 154(b) by 0 days.

(21) Appl. No.: 14/626,892

(22) Filed: Feb. 19, 2015

Related U.S. Application Data

(60) Provisional application No. 61/941,834, filed on Feb. 19, 2014.

(51) Int. Cl.
*A47C 31/00* (2006.01)
*B60R 11/00* (2006.01)
*A45F 3/24* (2006.01)
*B60N 2/30* (2006.01)

(52) U.S. Cl.
CPC ............... *B60R 11/00* (2013.01); *A45F 3/24* (2013.01); *B60N 2/3095* (2013.01); *B60R 2011/004* (2013.01); *B60R 2011/0049* (2013.01)

(58) Field of Classification Search
CPC ............... B60R 11/00; B60R 2011/004; B60R 2011/0049; B60R 9/06; A45F 3/22; A45F 3/24; A45F 3/26; B60N 2/3095; A47C 3/0255

USPC .... 5/120, 127–128; 224/484–487, 488, 501; 297/273, 277, 280–281, 130, 217.7; 248/558; 472/118
See application file for complete search history.

(56) References Cited

U.S. PATENT DOCUMENTS

| | | | | |
|---|---|---|---|---|
| 2,209,145 A * | 7/1940 | Weber | ...................... | A47C 5/06 297/1 |
| 4,049,314 A * | 9/1977 | McGaffin | .................. | A47C 4/02 297/130 |
| 5,752,639 A * | 5/1998 | Rice | .......................... | B60R 9/10 224/510 |
| 5,950,890 A * | 9/1999 | Darby | ....................... | B60R 9/06 224/402 |
| 7,040,995 B2 * | 5/2006 | Lee | ....................... | A47C 3/0255 297/273 |
| 7,073,857 B1 * | 7/2006 | Bailey | ...................... | B60R 9/06 224/547 |
| D734,046 S * | 7/2015 | Shen | ............................ | D6/347 |
| 9,179,759 B1 * | 11/2015 | Turner | ..................... | A45F 3/24 |
| 2006/0061165 A1 * | 3/2006 | Molen | .................. | A47C 3/0255 297/273 |

* cited by examiner

*Primary Examiner* — Ingrid M Weinhold
(74) *Attorney, Agent, or Firm* — Amy Fiene; James Sonntag

(57) ABSTRACT

A system and kit with curved upright arms that can be configured into different configurations for supporting a chair or a hammock, where the support can be either from a vehicle hitch or a porch.

7 Claims, 28 Drawing Sheets

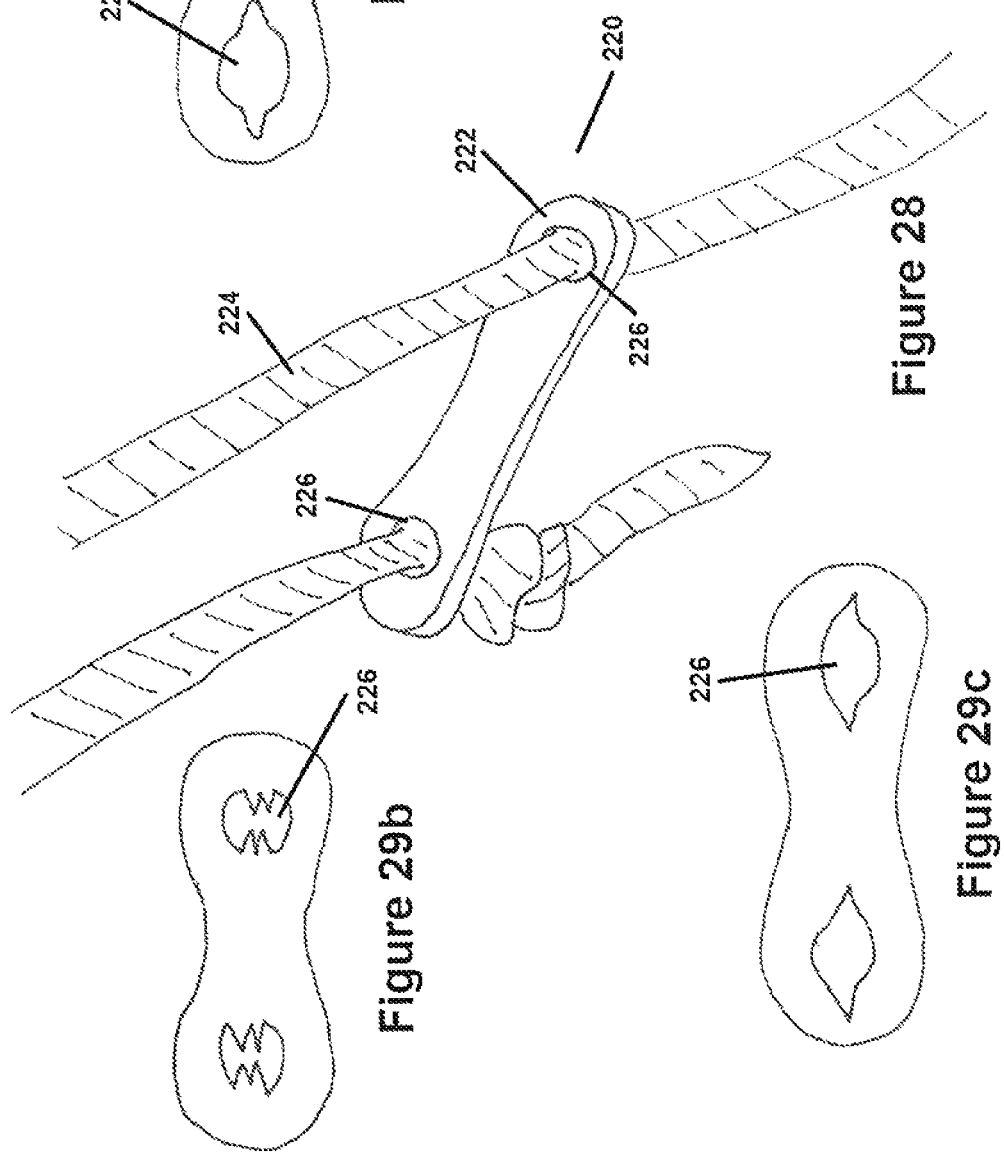

HAMMOCK AND CHAIR SUPPORT SYSTEMS

BACKGROUND

Hammocks provide a lightweight bed and are widely used for relaxing, resting, and sleeping. They generally comprise fabric, netting, or the like, and are suspended between supports at each end. In practice, they find use in many areas including backyards, campgrounds, beaches, and picnics. Hammocks generally require two end supports, such as a tree branch or tree trunk. A freestanding post, hook, or other support may be used as well. Some hammocks may even come with their own stands that provide end supports. Such a stand may limit portability of a hammock, however, given that stands may be heavy and bulky. Also, trees are not always readily available in a given environment, or they may be too weak or not have the right branch height. Finally, setup may be time-consuming and result in unstable suspension on either or both ends. One may end up bruised and broken from a collapsing end of the hammock. Thus, setup and portability limitations of current hammocks may not provide an ideal approach to relaxation and resting.

A variety of hammocks are available, including hammock hanging chairs, lightweight hammocks, and wide hammocks. Hammock hanging chairs may comprise a cross bar, two side bars, and a sling of canvas or similar material in which the user sits. The cross bar, which may have ropes extending from ends the cross bar, create a front to back depth for the sling type of chair. When used under a roof, the hook may be installed on the underside of a roof to suspend the chair. Alternatively, a stand with a top hook may also be used. Other means may also be used.

SUMMARY

The present disclosure involves mounting systems hanging chairs and hammocks. It includes at least the following aspects:
(a) A hitch mounted system convertible between mounting chairs or hammock,
(b) A hitch mounted system for mounting a wide hammock,
(c) A kit where that can be used to assemble various hitch mounted and porch mounted systems, including (a), (b) and other possible configurations. An important element of the kit are upright arms configured for chair or hammock supports that are hitch mounted or patio mounted
(d) A system for preventing tipping of wide hammocks, while sitting or getting in or out of a hammock,
(e) A system for quick adjusting ties and ropes and useful in any of the above systems.

DESCRIPTION OF THE DRAWINGS

FIG. 28 and FIGS. 29*a* to 29*c* show an infinite adjustment system.

DETAILED DESCRIPTION

Figure 1:
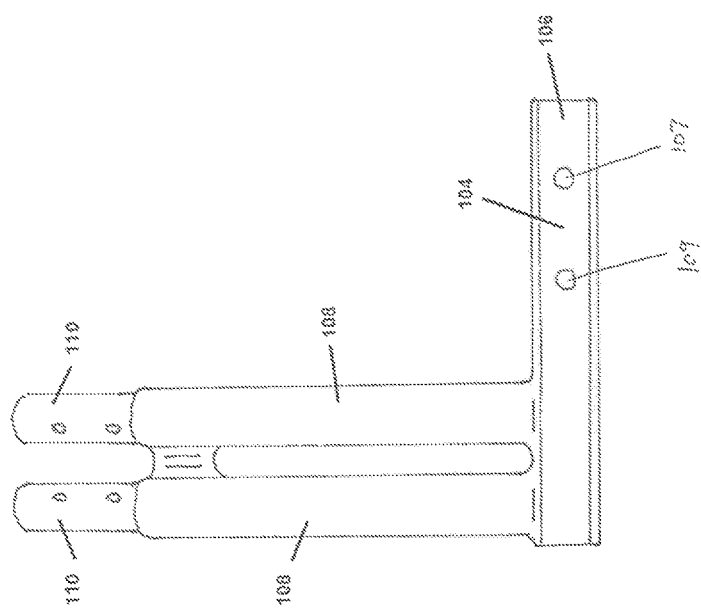
FIG. 1 is a side view of a base hitch.

Embodiments presented herein may be used in combination to provide support for a one or two hanging chairs configuration, light weight hammock configuration, porch mount hanging chair configuration, wide horizontal hammock configuration, and porch mount universal horizontal hammock stand, where are described in the following.

Hitch Mounted Convertible System for Chair or Hammock

An aspect is a vehicle hitch system that can be converted easily between two configurations by rearranging the parts. In one configuration one or two hanging chair structures can be supported, which can be readily converted to a structure for a hanging light weight hammock. The system involves a hitch mount, and upright arms that can be assembled together for a chair support or reassembled by flipping around the upright arms for a hammock support.

Referring generally to FIGS. 1 to 12, the hitch mount or base hitch 104 has structure for attachment to a vehicle by to the same structure used to mount a trailer hitch. For most currently used hitch systems, the hitch mount has a horizontal structure 106 for sliding into a vehicle receiver. Other systems for attachment to a hitch mount on a vehicle can be used, as well as custom system for attachment to other points on a vehicle, such on the front, or a door sill. Attachment can also be attached to trailers, or other wheeled or fixed structures that have the mass and stability to support the system. The vehicle can be a car, truck, RV, trailer, golf cart, and the like.

The hitch mount 104 also has at least two vertical mounting structures or members 108. These are constructed to support at least two upright arms 114. Each upright arm 114 has a first end 124 and a second end 126. Each end can be easily converted between attachment to a vertical structure, or to a hanger from which a hammock or chair can be suspended.

The upright arms each have a first end and a second end. For a chair support configuration, the first end of the upright arm is attached to a vertical member and the second end attached to and supports a hanger that will support a chair. For a hammock support two upright arms are supported by vertical members, and the first ends support hangers, which in turn support opposite ends of a hammock.

The upright arms are each characterized by a non-straight center axis. The function the non-straight axis is designed to provide sufficient distance and to displace hanging ends to provide clearance, or to avoid interference in both configurations, while using the same upright arms. In a chair support configuration, this requires that vertical distance be sufficient to allow hanging of the chair and where the second end is sufficiently displaced such that the upright arm does not interfere with the hanging and function of the chair. In a hammock support configuration this requires that the horizontal distance between the first ends is sufficient to support a hammock from the hangers, and sufficient first end displacement where the upright arms do not interfere with the hanging and function of the hammock. Another consideration is that the upright arms and hitch mount provide enough displacement from the vehicle so that vehicle structure does not interfere with the hammock.

The non-straight center axis can also be described by defining a first portion 116 of the arm adjacent the first end, and a second portion 118 near the second end. The axis is made non-straight by changing the relative bearing of the axis. The change is greater in the second portion, than the first portion, while in the first portion the change in relative bearing is less or zero (the axis is straight). Changing relative bearing describes the degree difference between direction of the axis between two different points, or the amount the direction of axis changes over a length. This can also be described as the amount the axis curves so that a 90 degree curve, for example, is the same as a 90 degree change in the relative bearing. Changes in the relative bearing can occur by configurations that are not strictly "curved". For example, an upright arm made of straight members joined at angles is not strictly curved, but is contemplated by the present invention. So, for example, an upright arm that is L-shaped made from two straight parts can have a "curvature" as used here by having a relative bearing change of 90 degrees.

As used in the specification and claims "curvature", "curve", and "curved" have the same meaning as a relative bearing change, and refer to curved upright arms as well as upright arms with straight members joined at an angle.

The system is configured for support of a chair structure when at least one upright arm is attached to one of the vertical mounting structures with the first end attached to the vertical mounting structure or member, and the second end attached to a hanger 138. Here, length of the upright arm is sufficiently high to provide clearance for support of a chair suspended from the hanger, and the curvature is sufficient to provide displacement of the chair from the upright arm and vehicle to allow function of the chair structure without interference from the upright arm and vehicle. The vertical distance above the ground is provided by upward alignment, mostly in the straight or mostly straight first portion, while the displacement to avoid interference are provided by curves, mostly in the second portions, The system is configured for support of a hammock structure 142 when at least two upright arms are attached to the vertical mounting structures with the second ends attached to the vertical mounting structure, and the first ends extending horizontally from each other and attached to a hanger, In this configuration, the curves in the second end function most to redirect the axis of the upright arm, in a horizontal direction, so that the first ends can extend away from each other to provide the distance required to mount a hammock suspended from the hangers.

It has been found that the curvature in the second portion can suitably be near 90 degrees. At less than ninety degrees avoidance of interference, particularly in the chair configuration, can be more difficult, and this provides a suitable horizontal path to space the first ends from each other in the hammock configuration. It is understood that minor curvature s-curves, or reverse curves, can be added in either one or both the first and second portions for aesthetic reasons, to make small adjustments to the non-interference displacement, or any other reason.

In the illustrative examples below, there are two vertical mounting structures or members 108. Two are required for a hammock configuration, and with two the chair configuration can be used for one or two chairs. Further mounting structures may be added to support, for example, more upright arms to provide extra supports, as for example, two arms to support a single chair, or two arms for each or one end of a hammock. Vertical mounting structures, or added mounting structures of a different configuration, a second hammock attachment, or can used to support auxiliary structures, such as umbrellas, tables, cup holders, TV, tablet, or computer, supports. For the hammock configuration, lightweight hammocks are shorter and accordingly design for lightweight hammocks is easier than for wide hammocks that are necessarily longer, and usually require more clearance to function. However, it is contemplated that the system can be designed for horizontal distance and clearances great enough for wide hammocks.

To enhance portability, it is contemplated the upright arm be provided with a joint 122 between the first portion and the second portion, so that the upright are can be separated into two separate pieces, The joint is rigid and designed to reversibly part and rejoin the first and second portions. Any configuration is suitable, such as the tubular swedged telescoping design described below.

Example of Hitch Mounted Convertible System for Chair or Hammock

Turning to FIG. 1, a hitch mount or base hitch 104 is shown. The base hitch is one of the combination of members and is used for a setup of a hanging chairs configuration or alternatively a lightweight hammock configuration. Embodiments include that the base hitch be used for other configurations readily appreciated in the art. The base hitch 104 comprises a generally horizontal bar 106 and at least two vertical members 108. The horizontal bar 106 and vertical members 108 each comprise receiving structure or attachment locations. Vertical members 108 comprise receiving structure 110. The horizontal bar 106 of the base hitch 104 may be inserted into a receiver 102 for trailer hitch of a car, truck, RV, other vehicle, or other body with a receiver for a hitch. The receiving structure includes, for example, pins (not shown) that may extend through holes 107 and 109 on the horizontal bar to secure the base hitch to the vehicle. Each pin may be locked into position by a clip (not shown). A hook (not shown) may also be used to secure the base hitch. Other known means for securing a base hitch are contemplated.

Figure 2:
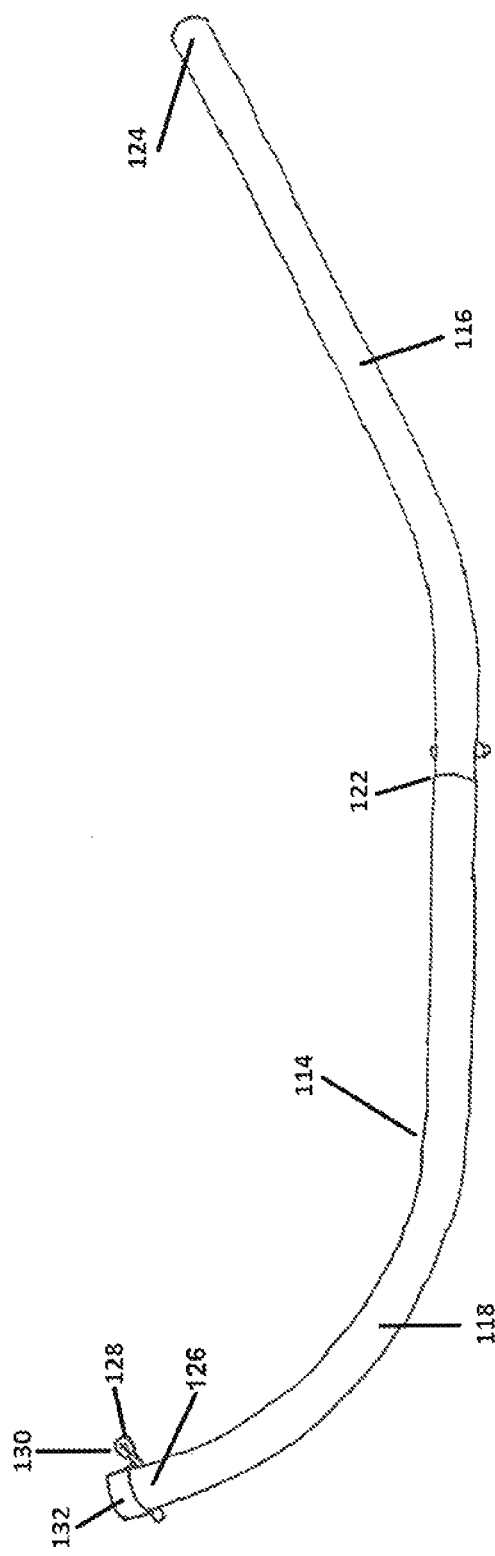
FIG. 2 is a side view of an upright arm with attachments for different configuration, such as for a chair configuration, wide hammock and porch configurations.

Turning to FIG. 2, an upright arm 114 is shown. The upright arm 114 has first end 124 and a second end 126 and can be one piece or comprise two portions, a first portion 116 and a second portion 118. Here shown is the optional joint connection 122 between the first portion 116 and the second portion 118. Types of attachment to form the joint connection 122 may vary and are described in greater detail below. The illustration shows one joint in an upright arm, but there may be more than one joint connection if it is desired to break it down into shorter pieces.

The members described may be made of metal, plastic, or a composite. They may be hollow tubes or solid tubes. They are rigid members with optimal tensile strength that may withstand shearing forces, weight, and torque. The first portion 116 and the second portion 118 are attached to form an upright arm 114. In the illustrated example, on the second end 126 there is an attachment 130 for a hanger, shown here as a hook 128. This is the configuration for a chair configuration. A cap 132 is shown to cover the end of the hollow tube upright arm 114. As described the hanger attachment 130 may be attached to either the first or second ends 124, 126 of the upright arm, depending on whether a chair configuration is desired. The hanger attachment 130 may be may be used to suspend a chair, a hammock from a flexible hanger, or other bedlike structure.

As In this example, the second portion 118 comprises a curved tube-like structure. Its curvature is defined so that it may be used in combination with the other members in different configurations to accommodate dimensions of the various structures listed. As shown, curvature is sharper and more readily defined starting at or near its midsection. The upper upright straightens out into a generally straight line as in the first portion 116. The first portion 116 has a short section that is straight, curves sharply at roughly between 20-60 degrees, with the free end extending from a long straight section of the first portion 116 after the curve. Thus, there is a generally straight path of the axis where the first and second portion 116, 118 meet.

Figure 3:
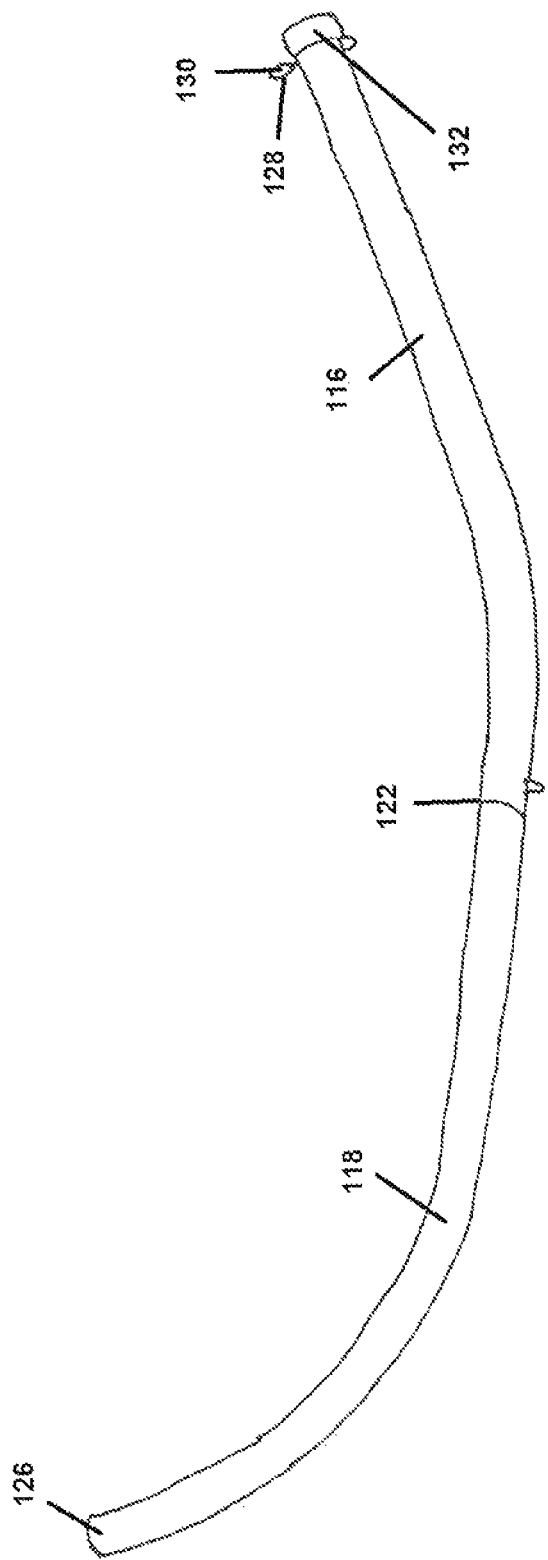
FIG. 3 is a side view of an upright arm with attachments for, for example, a hammock configuration.

Turning to FIG. 3, this shows the same upright arm as in FIG. 2, but with attachment 130 attached to the first end. This is the configuration for a hammock configuration.

Figure 4:
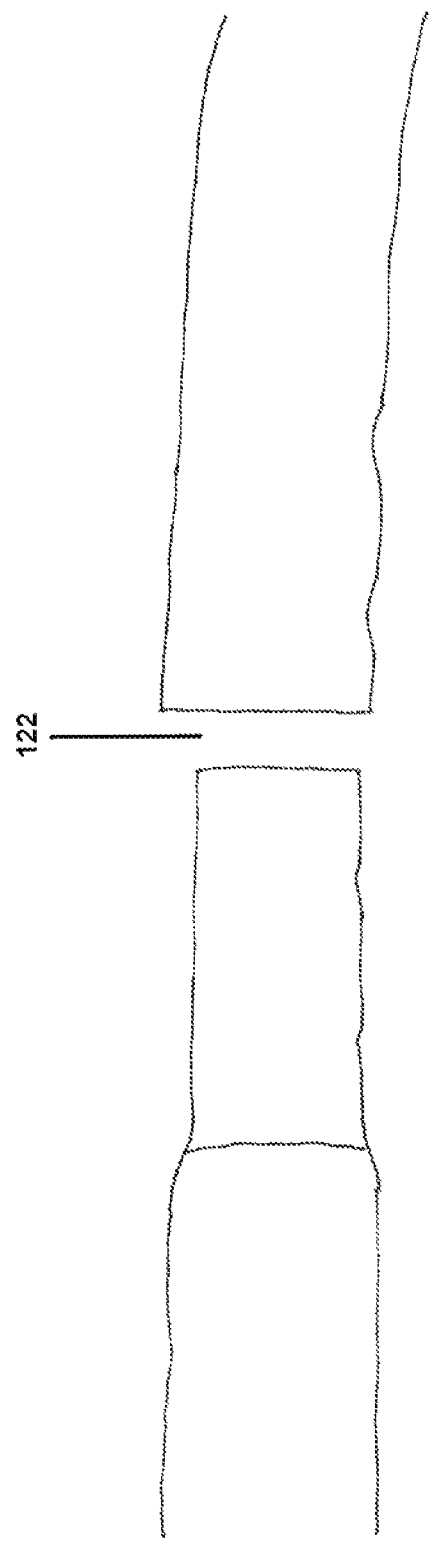
FIG. 4 is a side view of a one-way swedged connection between two elements.
Figure 5:
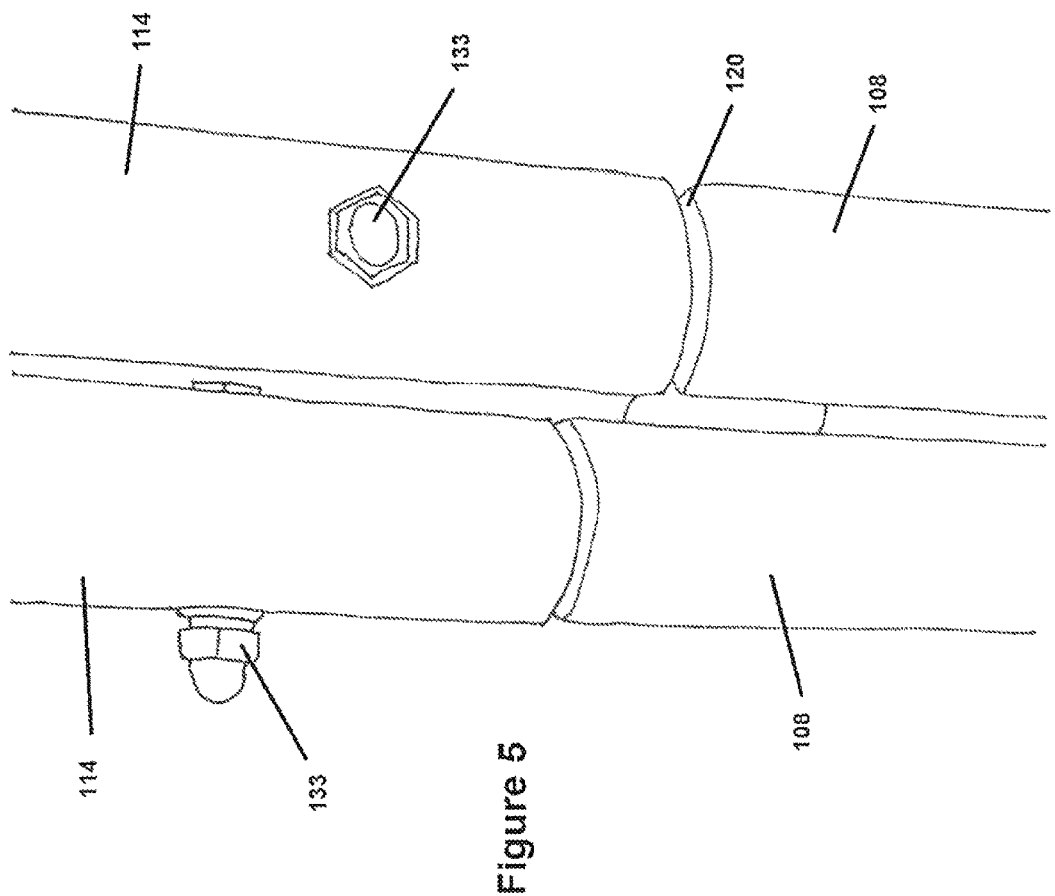
FIG. 5 is a perspective view of bolt and nut connection between two elements.
Figure 6:
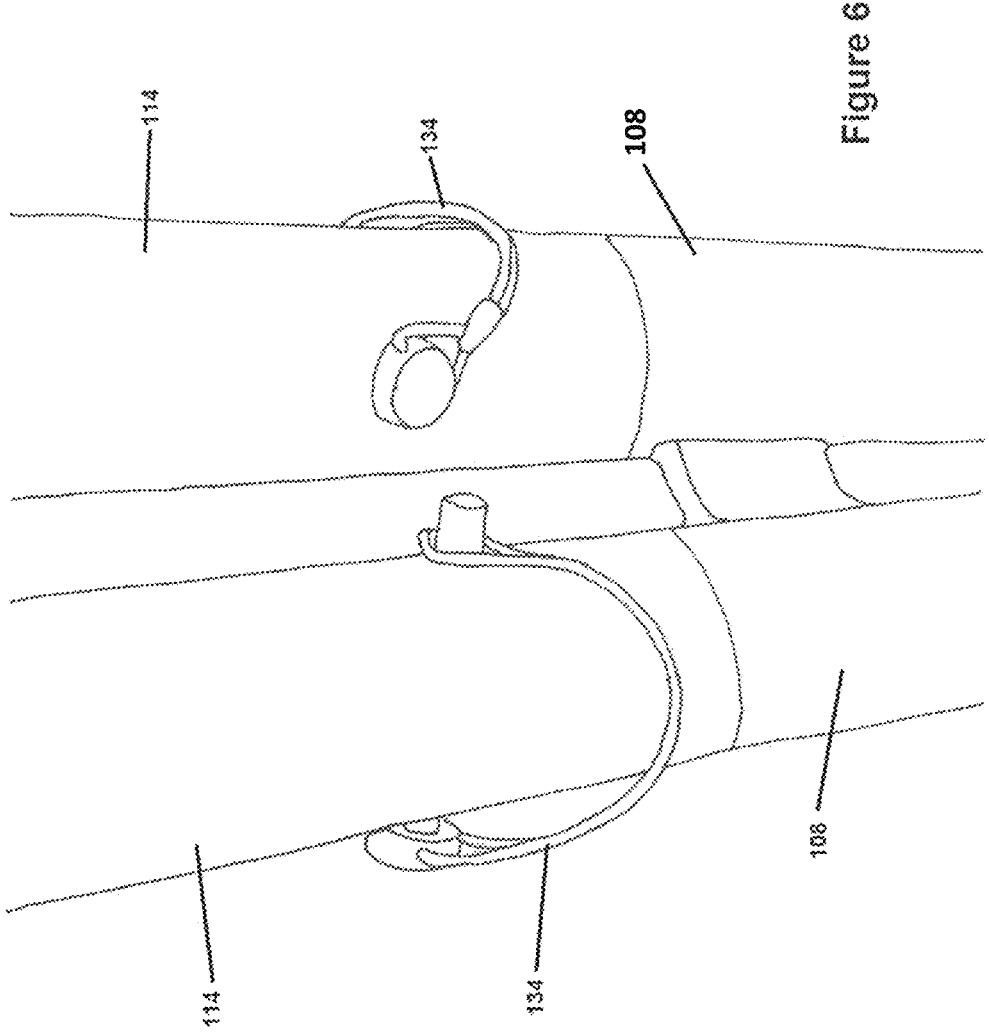
FIG. 6 is a perspective view of a quick pin system connection between two elements.
Figure 7:
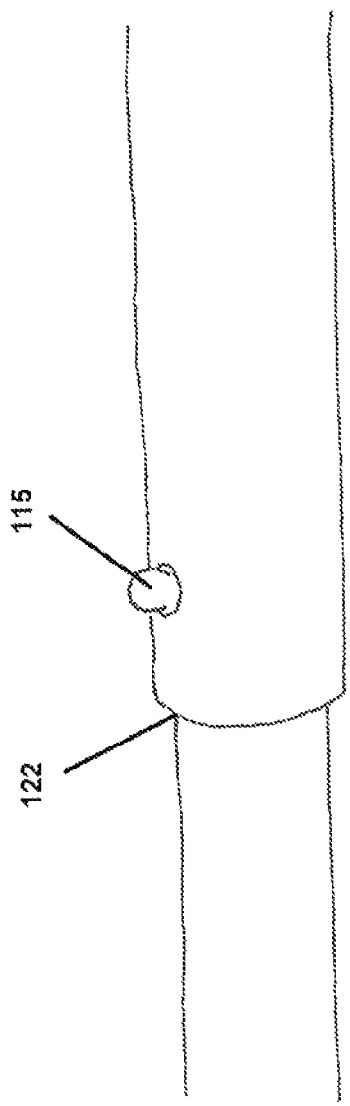
FIG. 7 is a perspective view of a push button telescoping connection system.
Figure 8:
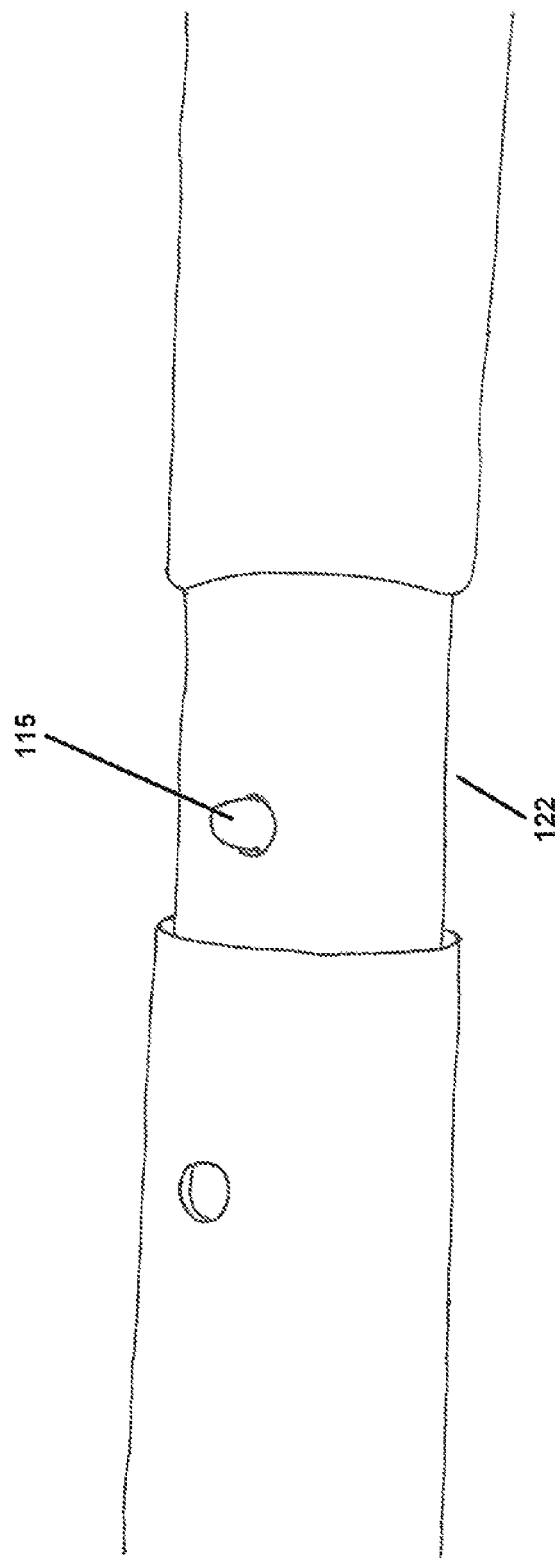
FIG. 8 is a perspective view of a push button connection system.

Turning also to FIG. 4, an exemplary unconnected view of a joint connection 122 between first portion 116 and second portion 118 is shown. While the illustration may be applicable for the joint connection 122, it may equally apply to other fixed joinders between other elements as appropriate. For example, it may describe attachment 120 of upright arms 114 to vertical members 108. In FIG. 4, one end of a connector, or tube, is swedged together. One end of a connector is smaller to be telescopically encased within an end of another connector. This is considered to be a male and female connection. Other male/female connections may also be fabricated from separate tubes or any other suitable construction. Both adjacent element could instead be joined by a bolt and nut system 133 as seen in FIG. 5 or could have a quick pin assembly as shown in FIG. 6 (both showing attachment 120 of upright arms 114 and vertical members 108) to have a quick release. Also, a connection could include a push button locking system. FIGS. 7 and 8, show push button systems 115 used on joint connection 122, (but could also be used, for example on attachment 120 between upright arm 114 and vertical members 108). FIG. 7 shows a push button system where one rod overlaps or extends beyond the other rod and is secured by a push button. FIG. 8 shows an alternate push button system in which the two rods abut against each other and are secured together by a push button and an inner sleeve. While joint connection 122 describes the connection between first portion 116 and second portion 118 and attachment 120 describes the connection between upright arm 114 and vertical members 108, note that a joint connection and an attachment may actually be the same type of a connection.

Figure 9:
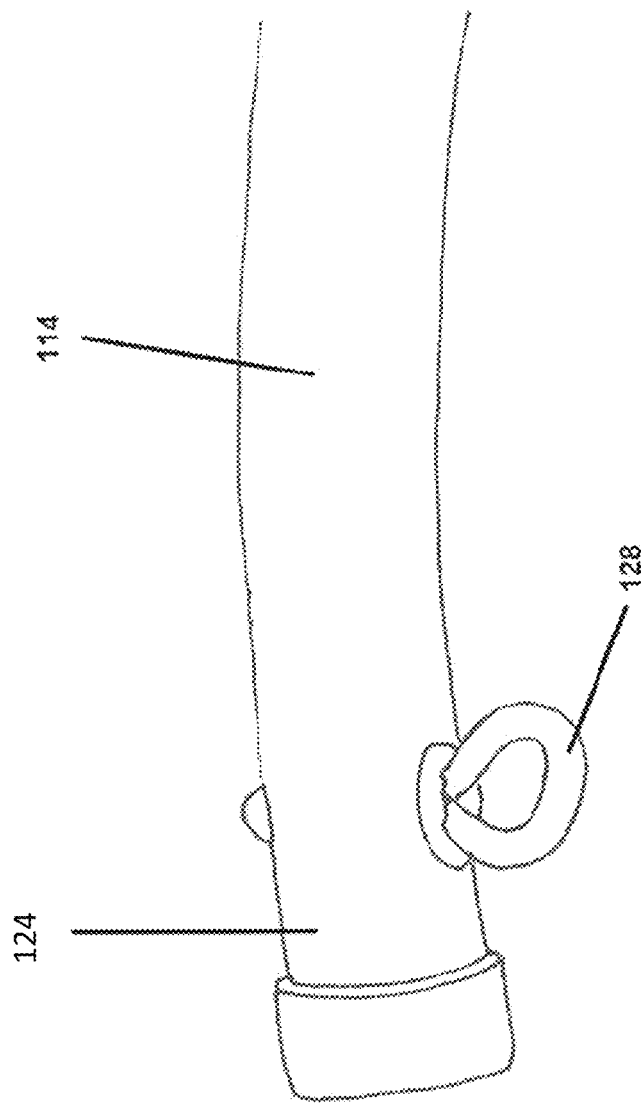
FIG. 9 is a perspective view of an end of an upright arm with an attachment hook.

Turning to FIG. 9, a hook or eye 128 for use as an attachment 130 for a chair or hammock hanger is shown fixed near first end 124 of an upright arm 114. Although shown for first end 124, a hook or eye may similarly be used for second end of 124, and first and second end of 126. Each combination or configuration described herein uses one or more such attachments or hooks in its assembly. Any suitable attachment 130 is contemplated.

Figure 10:
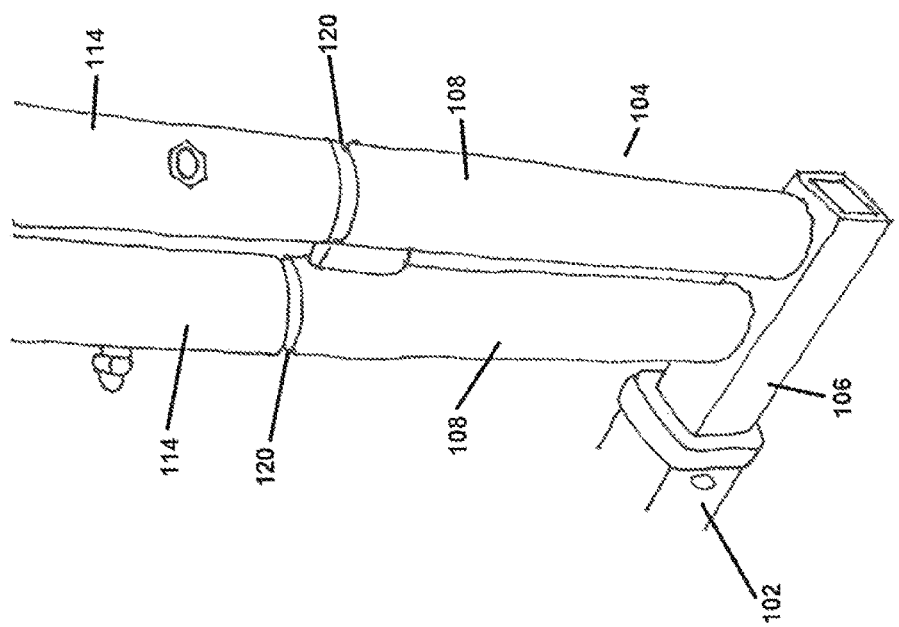
FIG. 10 is a perspective view of a base hitch attached to a vehicle.

Turning to FIG. 10, a base hitch 104 is shown mounted with the horizontal bar 106 inserted in to a receiver 102 of a vehicle. The base hitch 104 has vertical members 108, for attachment of upright arms 114 through attachment 120 (here showing a bolt attachment).

Figure 11:
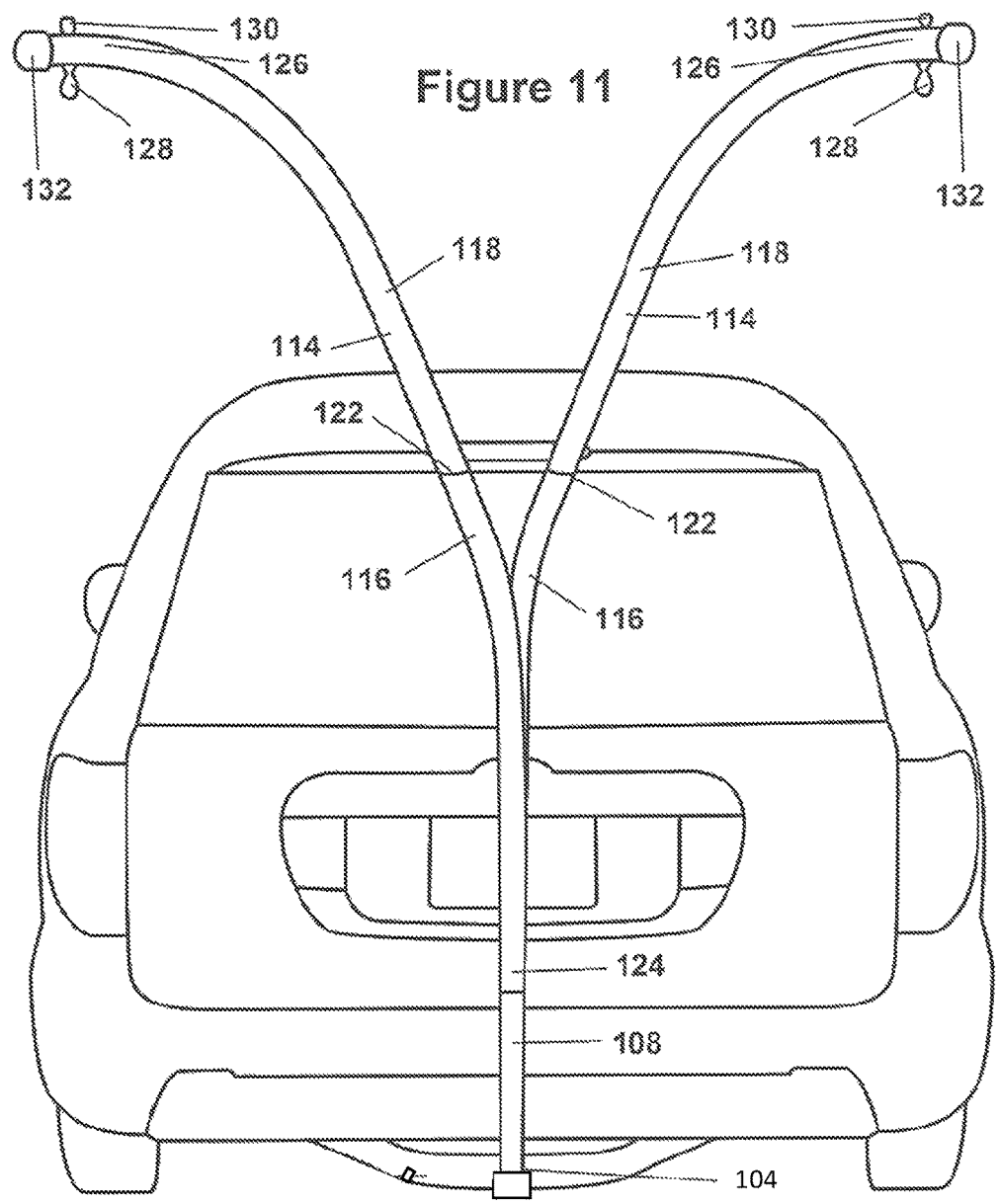
FIG. 11 is a front view of two upright arms, base hitch, and vehicle, for a chair configuration.

Referring to FIG. 11, is viewed a hanging chairs. This configuration uses a base hitch 104 with at least two upright arms 114 being joined to the base hitch 104 with one of the fastener systems described above. Shown are upright arms 114 with first end 124, second end 126, first portion 116, second portion 118, joint attachment 122 between portions 116 and 118, and hook attachment 128, and cap 132. As shown, the base hitch 104 for this configuration is inserted into the receiver of a vehicle 102.

Once the base hitch 104 is received and fastened, first ends 124 of the two upright arms 114 are inserted and received within openings of the vertical members 108. Upright arms are then removably secured at 120 to the vertical members with a locking system described previously.

Figure 12:
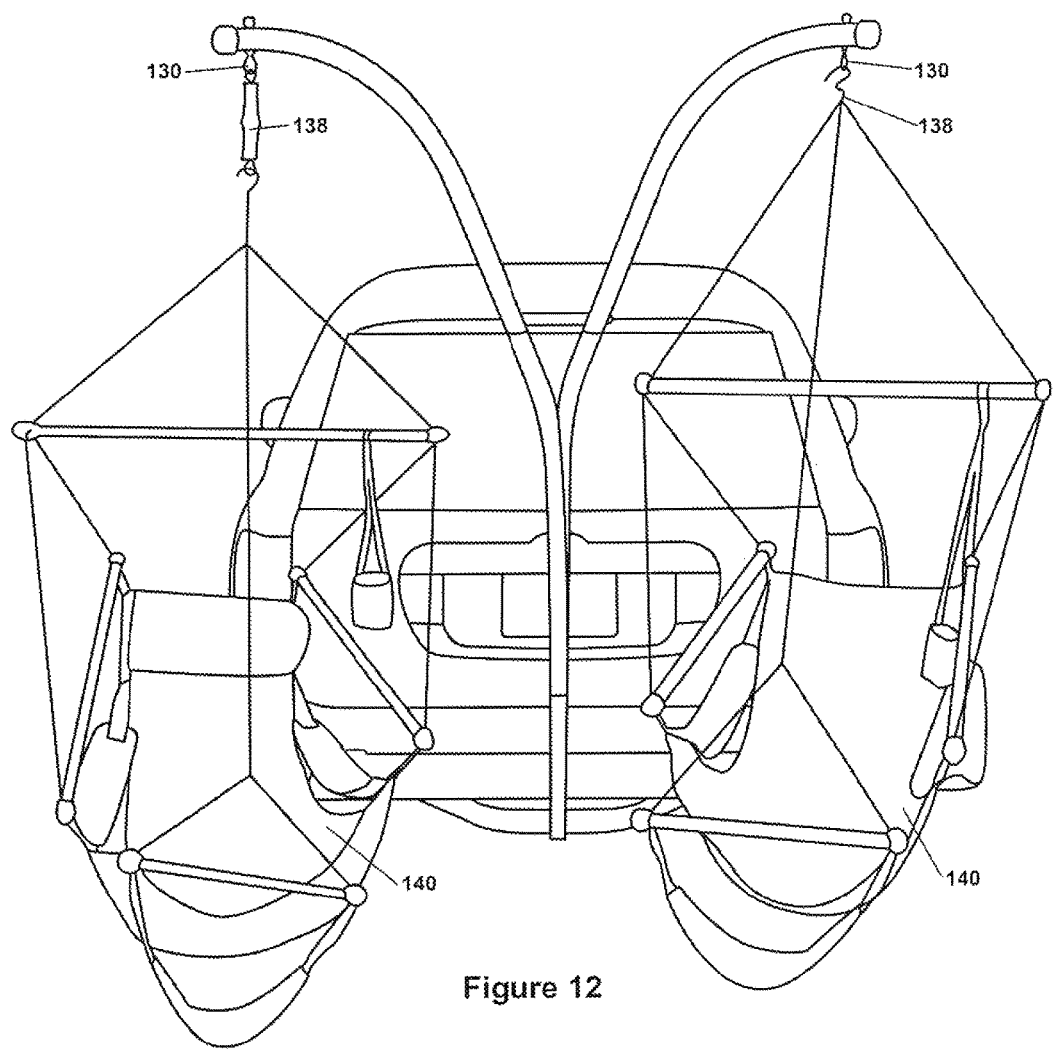
FIG. 12 is a front view of two upright arms, base hitch, and vehicle configured with two hanging chairs.

Turning to FIG. 12, hangers 138 from which chairs 140 suspend are attached to the hook attachment 128 to complete the chair configuration. Adjustments are secured by shortening or lengthening attachment ropes by any suitable method. A suitable method is disclosed later.

Figure 13:
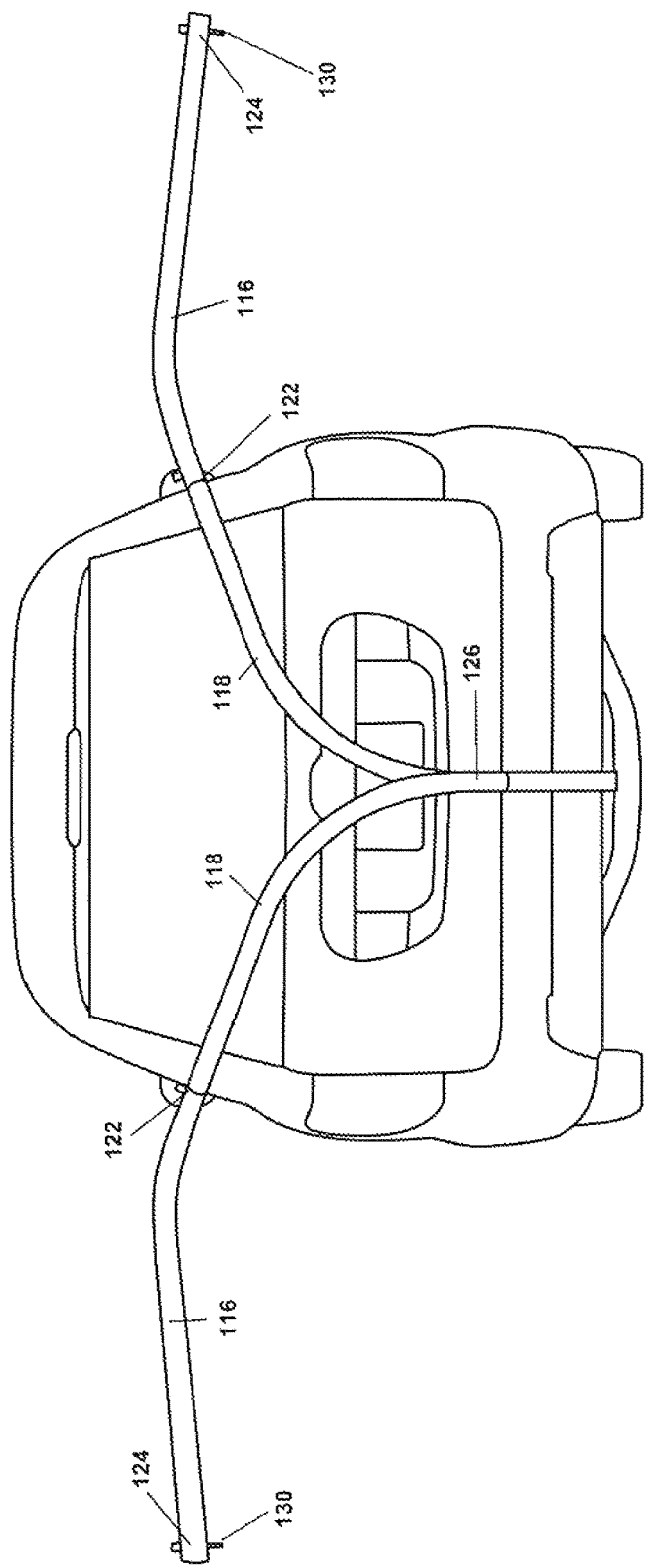
FIG. 13 is a front view of two upright arms, base hitch, and vehicle configured for a portable hammock.
Figure 14:
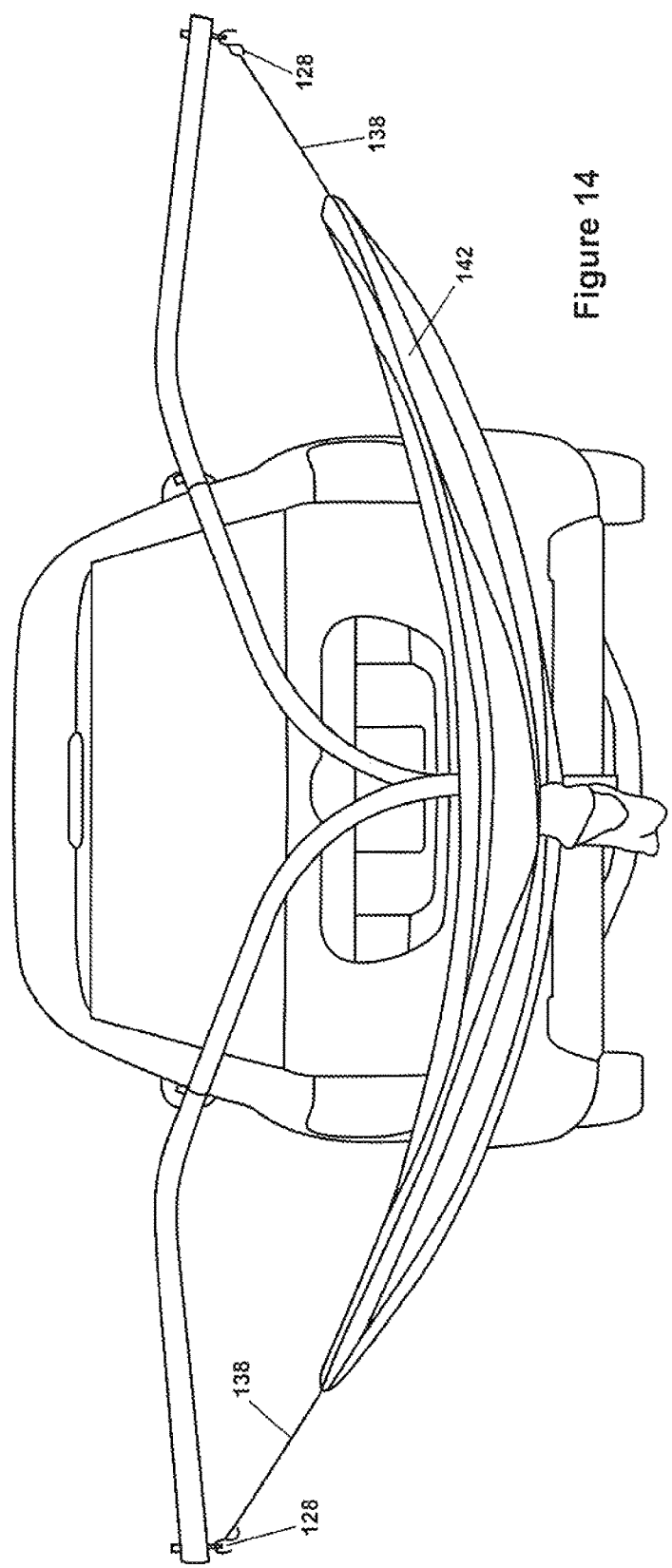
FIG. 14 is a front view of two upright arms, base hitch, and vehicle configured with a lightweight portable hammock.

The hammock configuration of the illustrated system is obtained by rearranging assembly. As shown in FIG. 13, the base hitch 104 is assembled to the vehicle in the same manner as for the two hanging chairs. The upright arms 114, however, are inserted on their ends opposite to the configuration for the hanging chairs. Specifically, the second end 126 of the upright arm 114 is attached to the vertical member 108 of the base hitch 104. At least two upright arms 114 are needed with the upright arms 114 aligned to space the first ends away from each other. At the first ends 124 attachment hooks 128 are provided Turning to FIG. 14, a lightweight hammock 142 through flexible hangers 138 on each end is suspended from the attachment hooks 128 on the separated first ends 124 to complete the hammock configuration.

Hitch Mounted Wide Hammock System

Another aspect of the invention is that part of the above described convertible systems can be used on other systems. An advantage of this is that a wide range of hammock and hanging chair configurations can be provided with a minimum of parts. These parts can be provided as kit containing the parts a consumer needs to assemble different configurations as desired.

Figure 15:
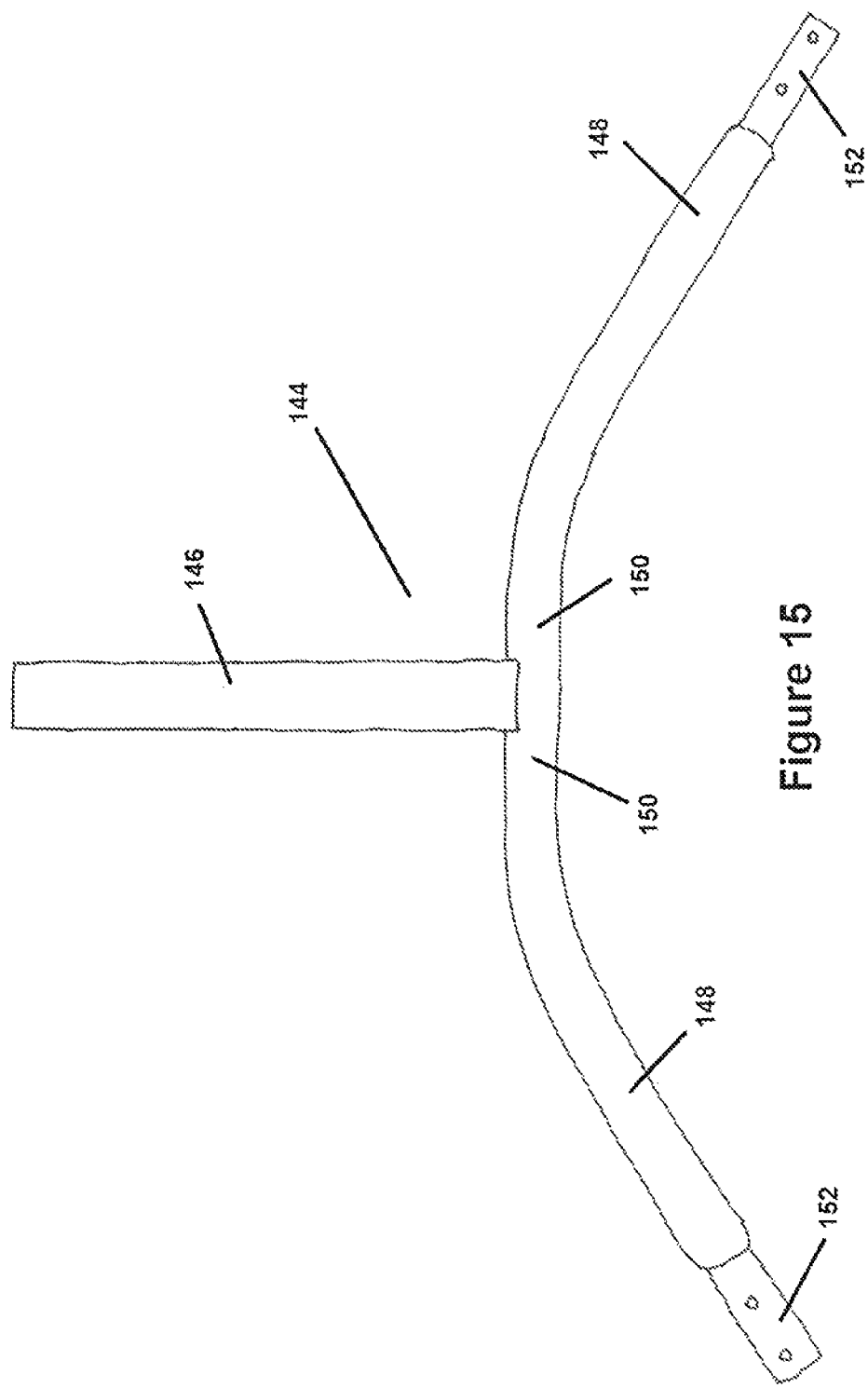
FIG. 15 is a view of a universal hitch.
Figure 16:
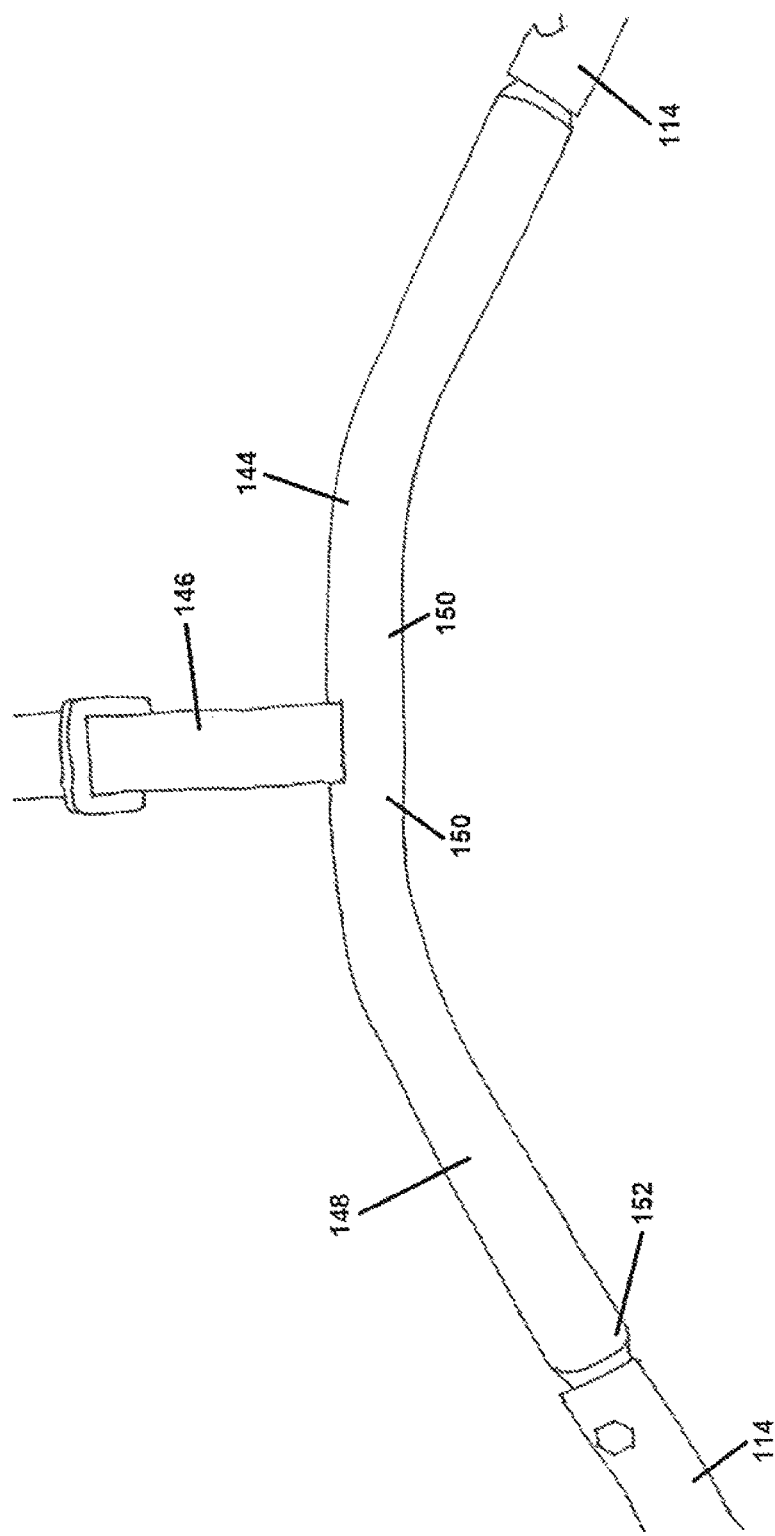
FIG. 16 is a top view of universal hitch mount attached to a vehicle.

Referring FIGS. 15 and 16, an aspect involves a universal hitch 144 mountable upon a vehicle, such as by attachment to a hitch receiver. The universal hitch comprises The universal hitch 144 comprises a horizontal hitch member 146 adapted to be inserted into a hitch receiver of vehicle. Attached to the horizontal hitch member 146 are two angular arms 148 at their first ends 150. The arms 148 extend generally in a horizontal plane, usually angled to the axis of the horizontal hitch member 146, away from the vehicle to second ends 152 in a horizontal plane away from the vehicle. The second ends are configured to receive an end of an upright arm 114, as described earlier. The universal hitch 144 may be fabricated in any suitable fashion. In the illustrated example a bar is welded at its middle to the end of the horizontal hitch member 146, to form the extended angular arms 148 extending from the weld.

Figure 17:
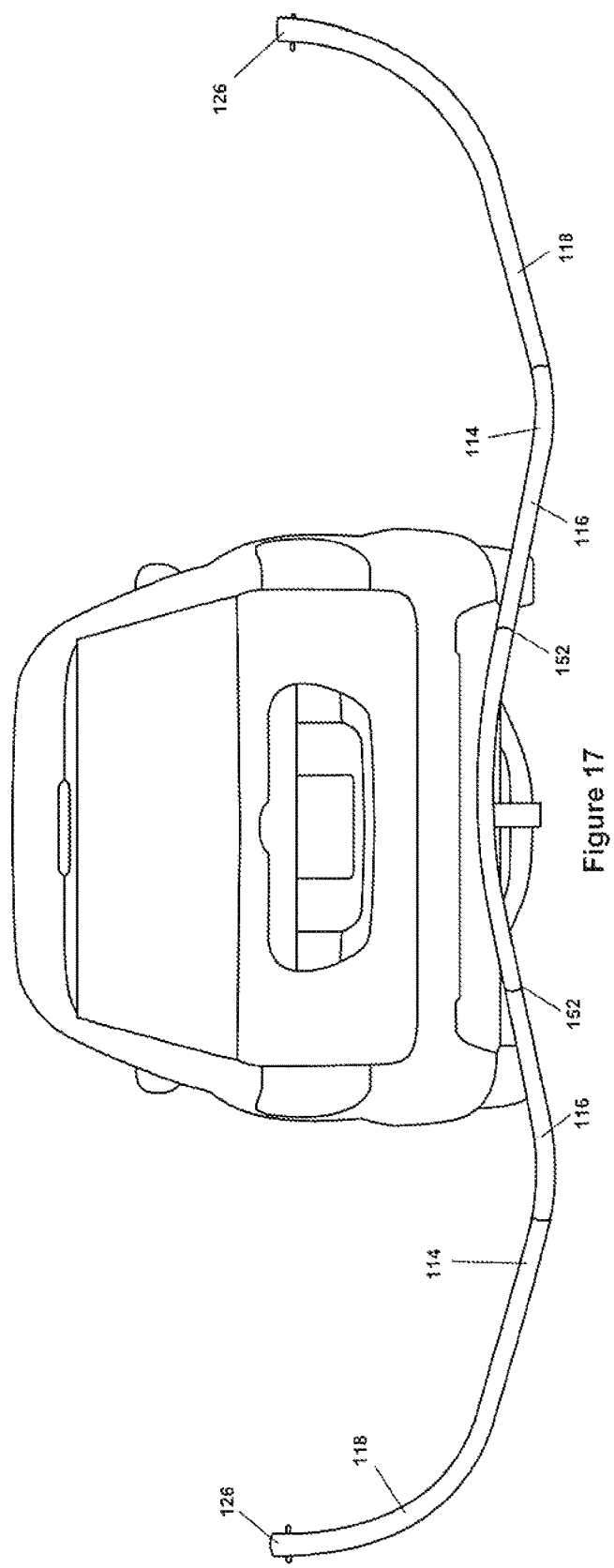
FIG. 17 is a front view of two upright arms, universal hitch mount, and vehicle.

Referring also to FIG. 17, to the second ends 152 of the angular arms 148 are attached two upright arms 114 by their first ends 124. The first portion 116 of the upright arm 114 continues to extend horizontally to space the second ends 126 of the two upright arms 114 from each other. In the illustrated example, the first portion 116 has a slight curve to direct the axis of the upright arm 114 to be more parallel to the rear of the vehicle. The curve is modest and does not compromise the function of the upright arm in other configuration (such as the hammock and hanging chair configuration above). The upright arm 114 is attached such that the curve in the second portion 118 directs the axis and the upright arm second ends 126 vertically so that the second ends have sufficient vertical clearance from the ground for a wide hammock support.

Figure 18:
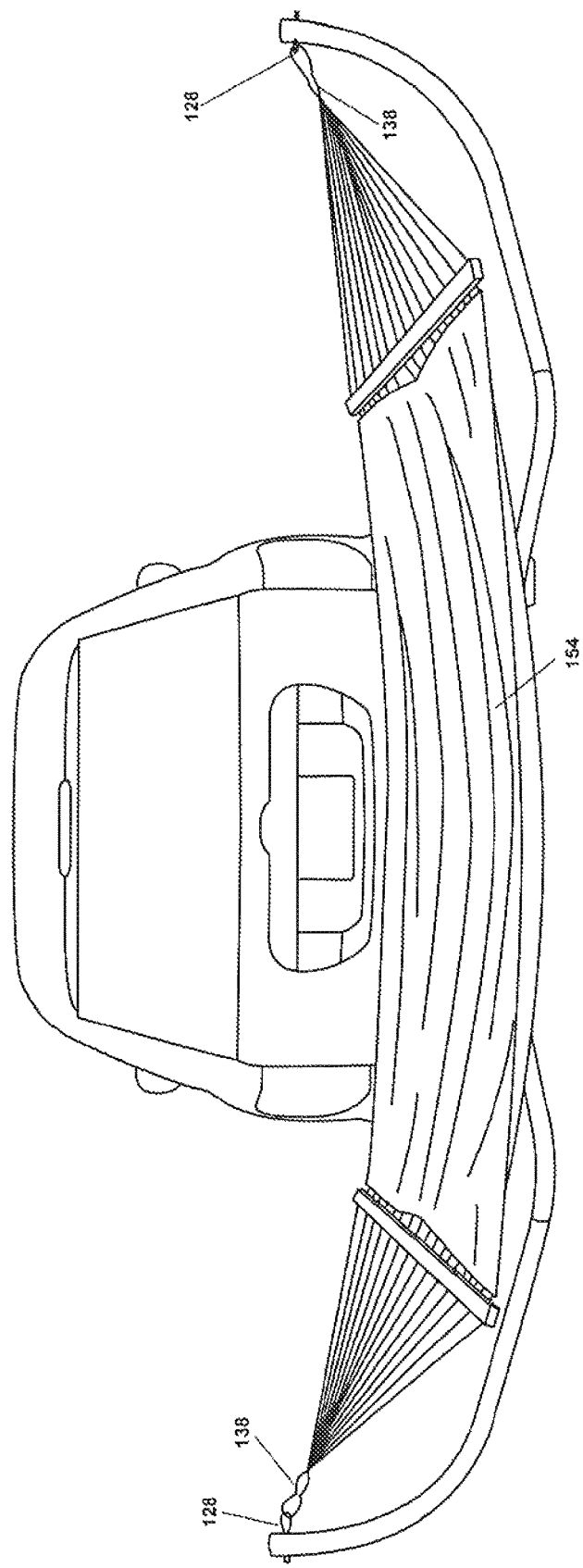
FIG. 18 is a front view of two upright arms, universal hitch mount, and vehicle configured with a wide hammock.

Referring also to FIG. 18, the two extended upright arm second ends 126 are configured for attachment of a hanger 138 to suspend a wide hammock structure 154.

This configuration is particularly adapted for a wide hammock, and uses upright arms 114 that are also used for the above hitch supports for lightweight hammock and chair support systems, and, as described below for various porch mounted configurations. A wide hammock support design is challenged by the long and wide dimensions of the wide hammock, while achieving sufficient vertical clearance from the ground. In the illustrated embodiment. The present design overcomes these challenges. For example, wide clearance from the vehicle is achieved by the length of the horizontal hitch member 146, and the angle and length of the angular arms 148. The length for a wide hammock is achieved by a combination of the length and angle of the angular arms 148, and having the first portions 116 of the two upright arms extending generally horizontally and away from each other. The first portions are also curved slightly to achieve more horizontal separation. The curved second portions are then used to achieve the vertical clearance. Adjustments of these properties combine to achieve a suitable design. The angular arms are suitable mounted to flare outward in a horizontal plane within a range of angles, for example, from 25 to 85 degrees. With this angle combined with length of the horizontal hitch member 146 can achieve a cantilevered horizontal distance from the vehicle. The angle must be such that combined with the configuration of the upright arms the second ends 118 of the upright arms 114 far enough apart. Also, the angular arms may turn slightly upward at a range to assist in achieving a vertical clearance.

The horizontal hitch member 146 of the universal hitch mount may be a fixed length to create a fixed distance perpendicular to the vehicle. Embodiments include, however, that the linear extension have variable lengths and variable fixed lengths to accommodate various widths of hammocks. Multiple securement features may be present to allow for variable length securement. Note that the universal hitch mount may use a hitch extender, not shown, to extend the universal hitch mount and base hatch away from a vehicle or other structure and thus make space for a larger hammock or larger bed structure. The hitch extender would connect or otherwise attach to the universal hitch mount or base hatch at its end and then be inserted to the trailer hitch receiver.

Turning to FIG. 18, a wide hammock is shown secured by flexible hangers 138 to hooks 128 on second ends of upper uprights to complete the wide hammock configuration. Note that embodiments include that a lightweight hammock or other hanging structure may be hung in place of a wide hammock.

The universal hitch mount extends out via the linear extension to a length that is farther out than the length provided by the base hitch.

Porch Mounted Hammock and Chair Configurations
Porch Mounted Chair.

Figure 19:
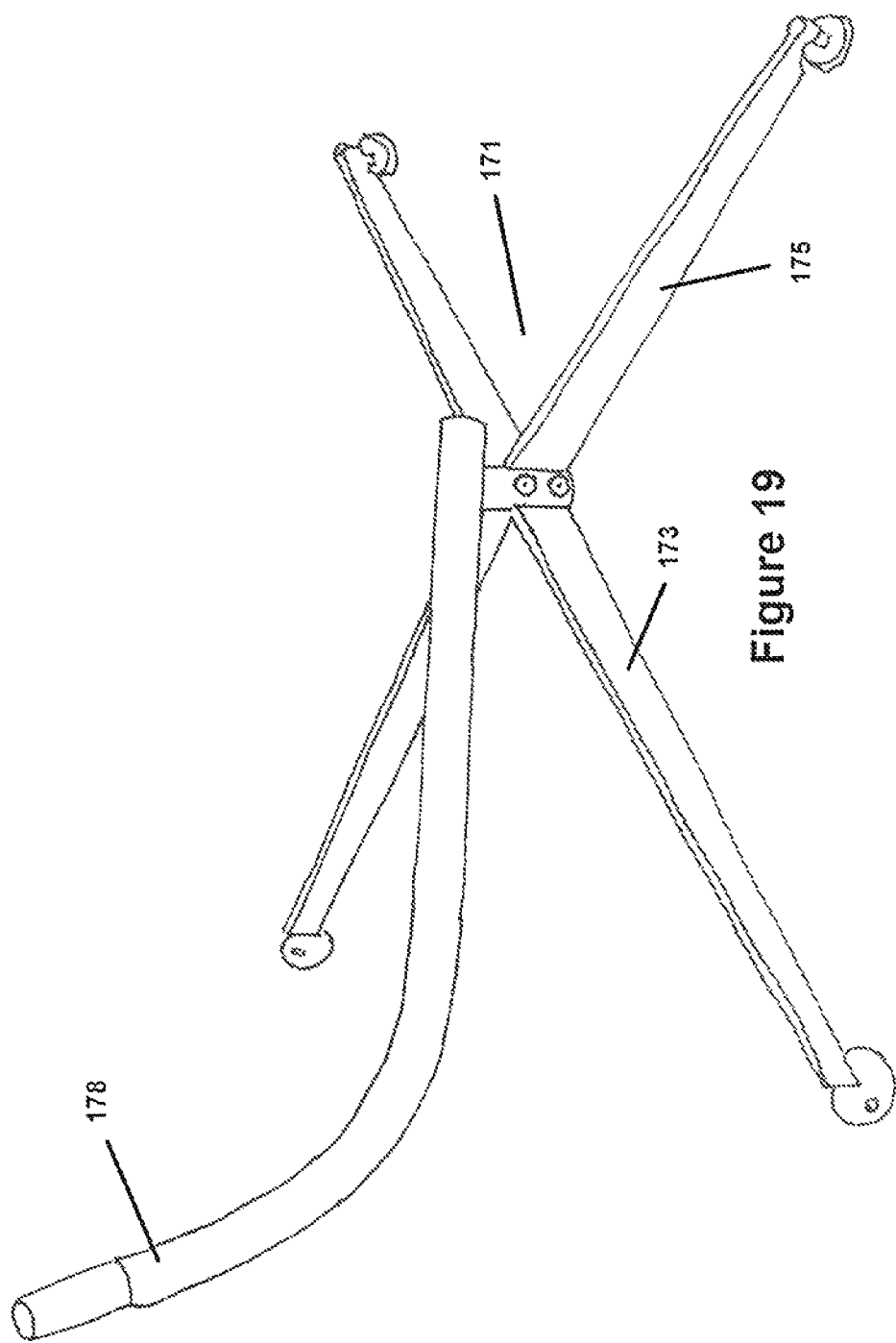
FIG. 19 shows a porch mount base.

Turning to FIG. 19, a chair porch mount 171 is shown, which comprises one or more leg fixtures and a lower upright. The leg fixtures 173, 175, as shown, may comprise multiple legs that extend outward, in a generally horizontal crisscross fashion, to provide stability and support for the lower upright to rest. As shown, two legs intersect to provide a cross bar base. Other types of legs or base supports may be used. For example, a circular base could be used. Instead of horizontal support, the legs could stand vertically upright, resembling chair legs or table legs. Other bases may also be used. From the base extends upwardly a mount arm 178, which is a generally horizontal or slightly angled straight member that curves to a nearly vertical, or to a range between 45 and 90 degrees. This is for attachment of an upright arm.

Figure 20:
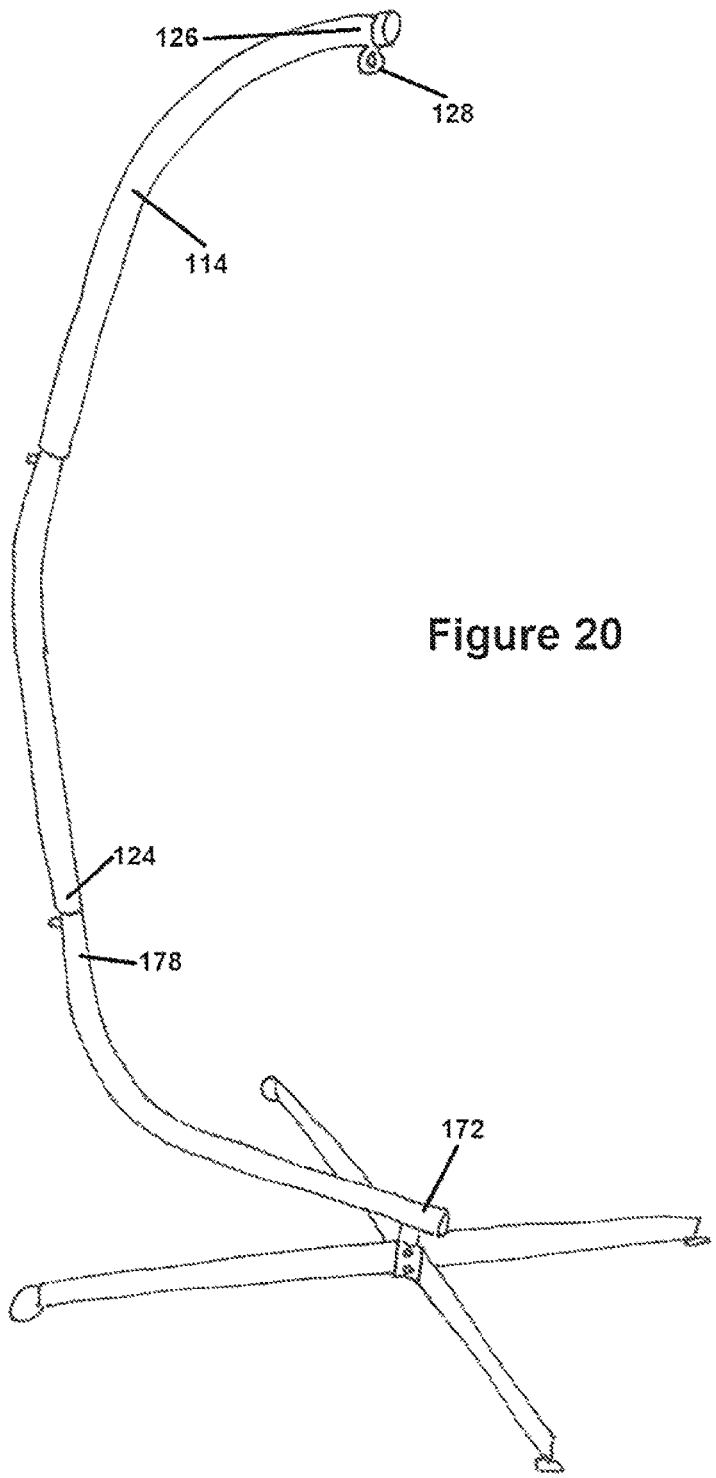
FIG. 20 shows an upright arm attached to a porch mount.
Figure 21:
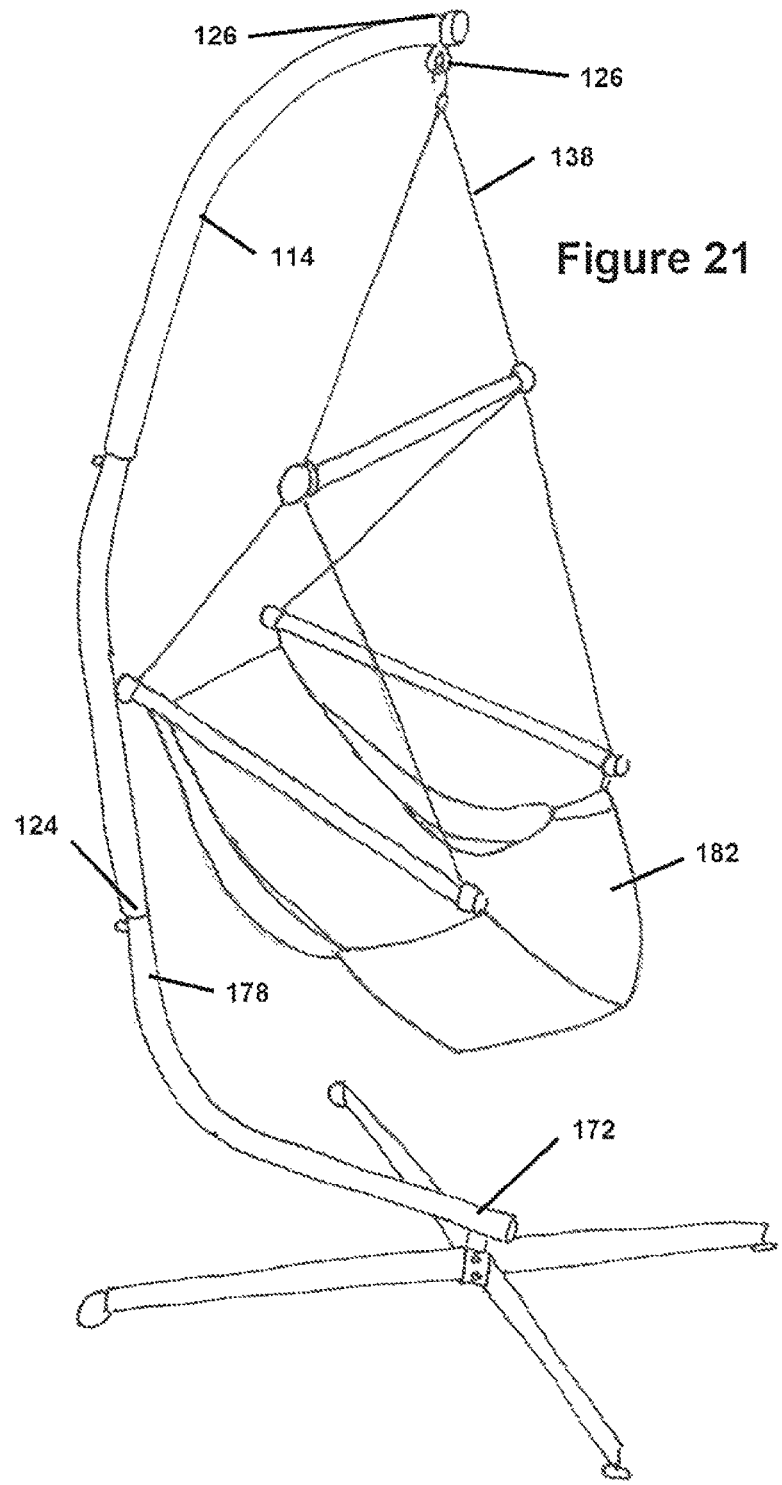
FIG. 21 is an upright arm attached to a porch mount configured with a hanging chair.

Referring also to FIG. 20, the mount arm 178 has is attached to the upright arm 114 at its first end 124. The second end 126 has a hook attachment. Referring also to FIG. 21, the hook attachment 128 supports a flexible hanger 138, which in turn supports a chair 182.

Hammock Porch Mount

Figure 22:
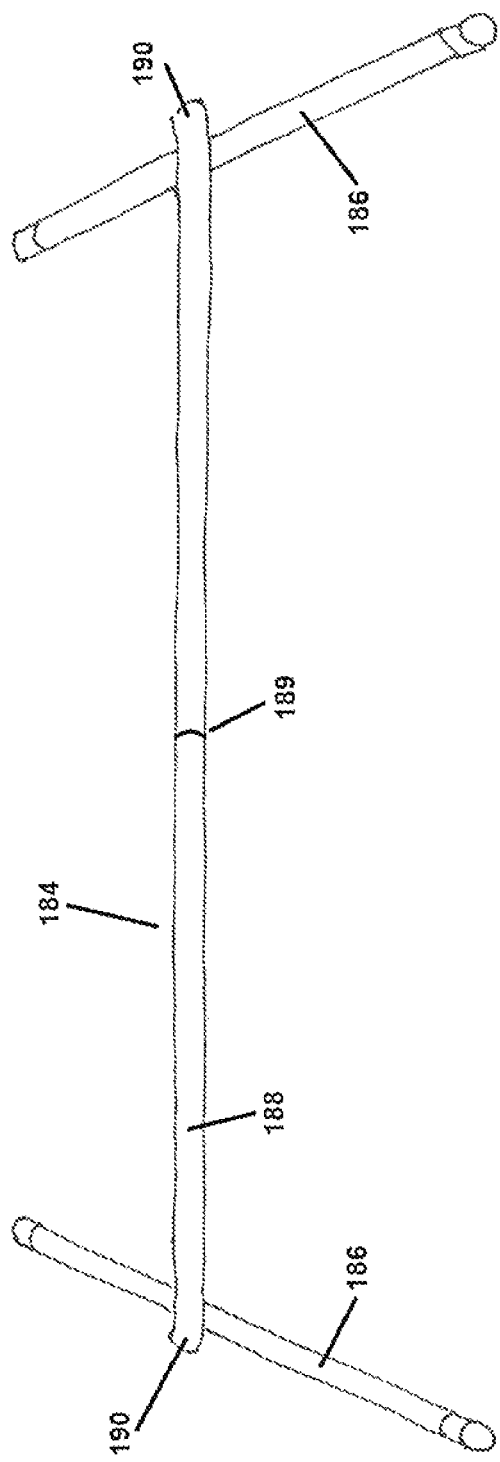
FIG. 22 is a perspective view of a horizontal hammock universal porch base.

Turning to FIG. 22, a universal porch mount 184 is shown. The universal porch mount 184 may be comprised of two or more elements that removably attach together. As shown, the universal porch mount includes two rod bases 186 and a connector 188 that attaches to the rod bases at or near the midline of the rod bases. Attachment of the rod bases may be achieved with welding, glue, nuts and bolts, or other adhesive means. Attachment may also be removable with fastening means described herein.

At or near the middle 189 of the connector 188, the connector may be separable into two halves which can be rigidly and reversibly connected by any suitable system, including those in this disclosure, comprising one or more, of pin-connector, bolt connector, telescoping sleeves that are assemblies or swedged tubes, or any other suitable system.

Figure 23:
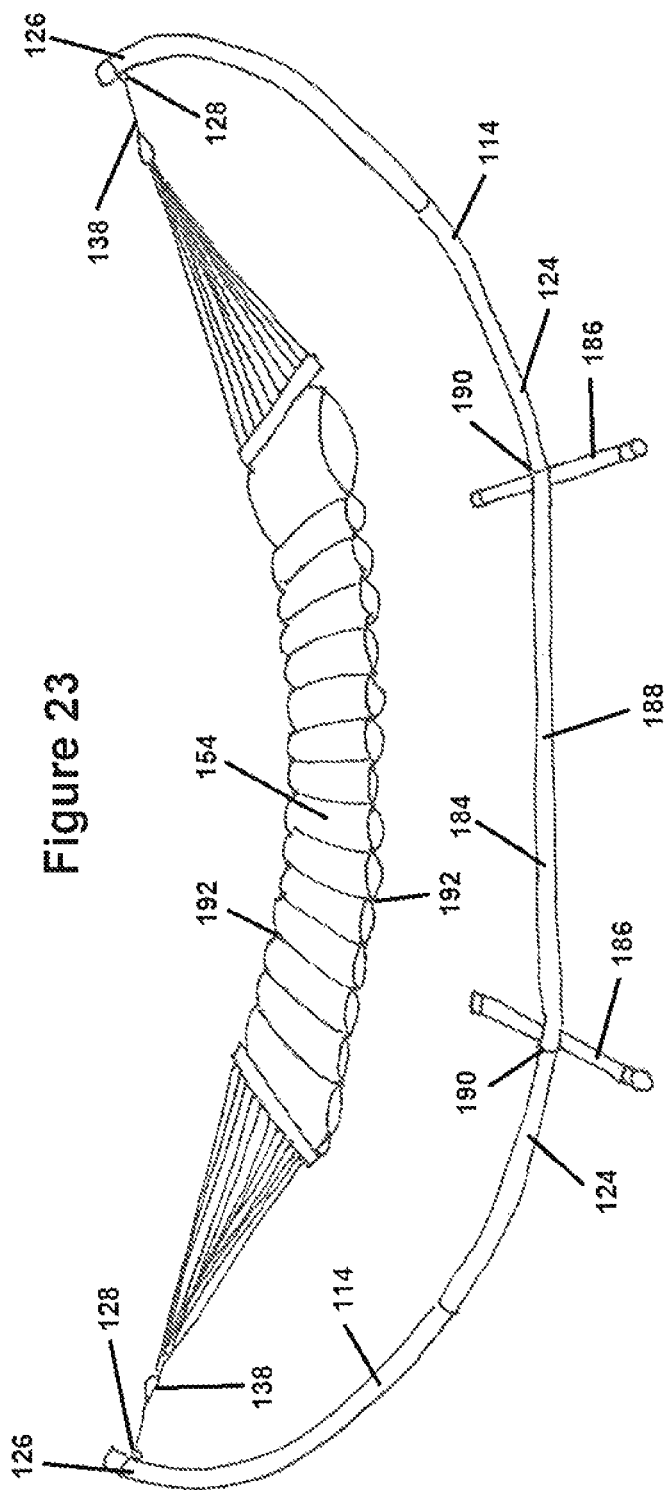
FIG. 23 is a perspective view of two upright arms and a universal porch mount configured with a wide hammock.

Each ends of the connector curved or angled upward, for example, between 25-80 degrees from the horizontal axis of the connector. Referring, also to FIG. 23, the desired angle within this range is selected to allow an upright arm 114 to be attached at its first end 124 to each end of the connector ends 190, and spread the second ends 126 of the upright arms. From hooks 128 at the second ends 128 flexible hangers 138 suspend a wide hammock 154.

Wide Hammock No-Flip Anchor

When a wide hammock is hung from one or more of two trees or vertical mounting points, such as the universal porch mount, the universal hitch mount, or any other suitable mounting system, a no-flip hammock strap and anchor may be included to prevent the wide hammock from being turned.

This combination is advantageous not only when trying to get in the hammock and get out of the hammock, but also for promoting stability while lying in the hammock and while adjusting position in the hammock.

Referring again to FIG. 23, the two upright arms are attached to second ends 126 of upright arms 114. The wide horizontal hammock 154 is attached via flexible hangers 138 to the second ends 126.

Figure 24:
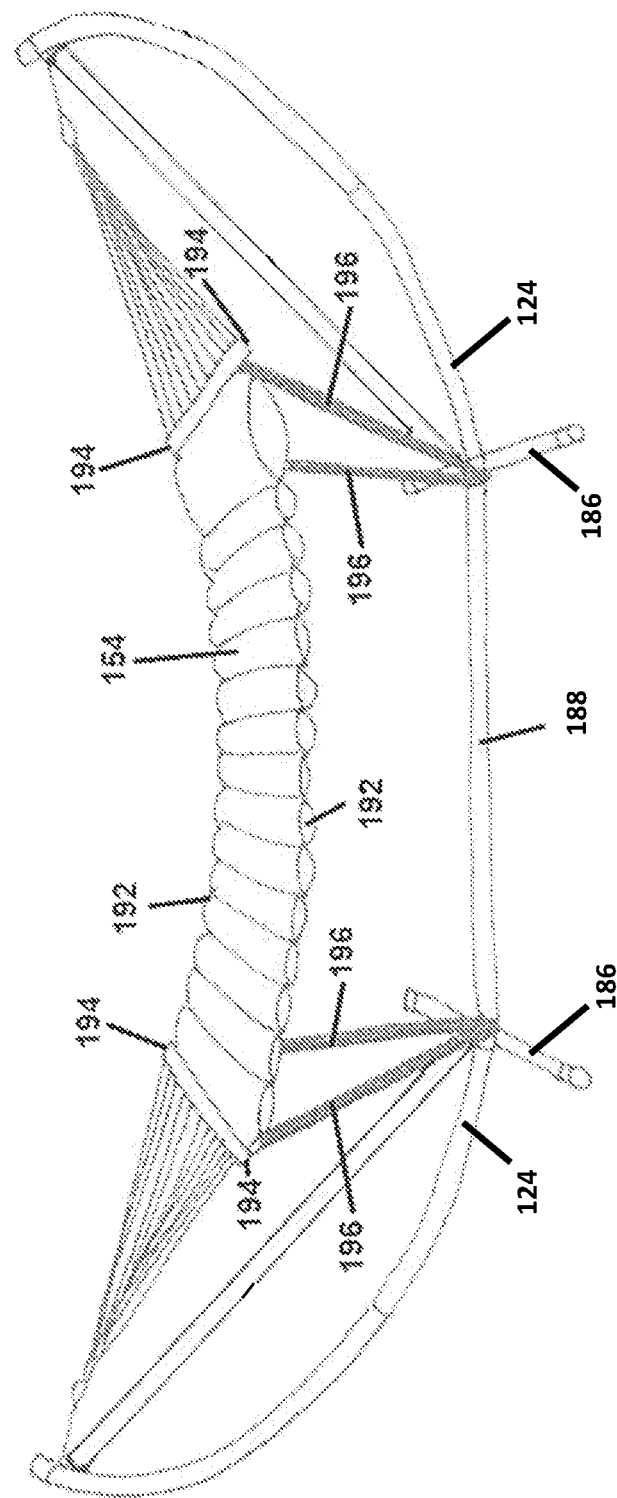
FIG. 24 is a perspective view of a universal porch mount configured with a wide hammock and no-flip straps.

Referring to FIG. 24, to limit the tipping of the hammock when a person sits on an side edge 192 a no-flip hammock strap 196 is attached to each corner 194 (usually at the ends of the spreader bar), and extended to any suitable anchor point on the base. As illustrated, the no-flip hammock strap 196 is wrapped around connector 188. The strap 196 may be attached to the connector 188, rod bases 186, or first ends 124. The strap lengths are adjusted to prevent the hammock from tipping to the point where a person sitting on the side edge or lying in the hammock will slide off. Adjustment of the straps may be by any system, including one or any of buckles, loops clasps and the like. The straps will stretch under tension and will prevent the rise of a side edge, due for example, a person sitting on the opposite side edge.

The no-flip hammock straps can be used on most wide hammock configurations. For example, the no-flip straps 196 used on a conventional hammock that uses straight support bars or other frame construction. Other embodiments include a variety of ways to suspend the wide horizontal hammock, including posts, poles, RV, vehicles, and other vertical stands. Such embodiments may use the anchors attached to the ground to attach the no-flip straps. The no-flip straps may also be used in hitch mounted system as in shown in FIG. 18.

Figure 25:
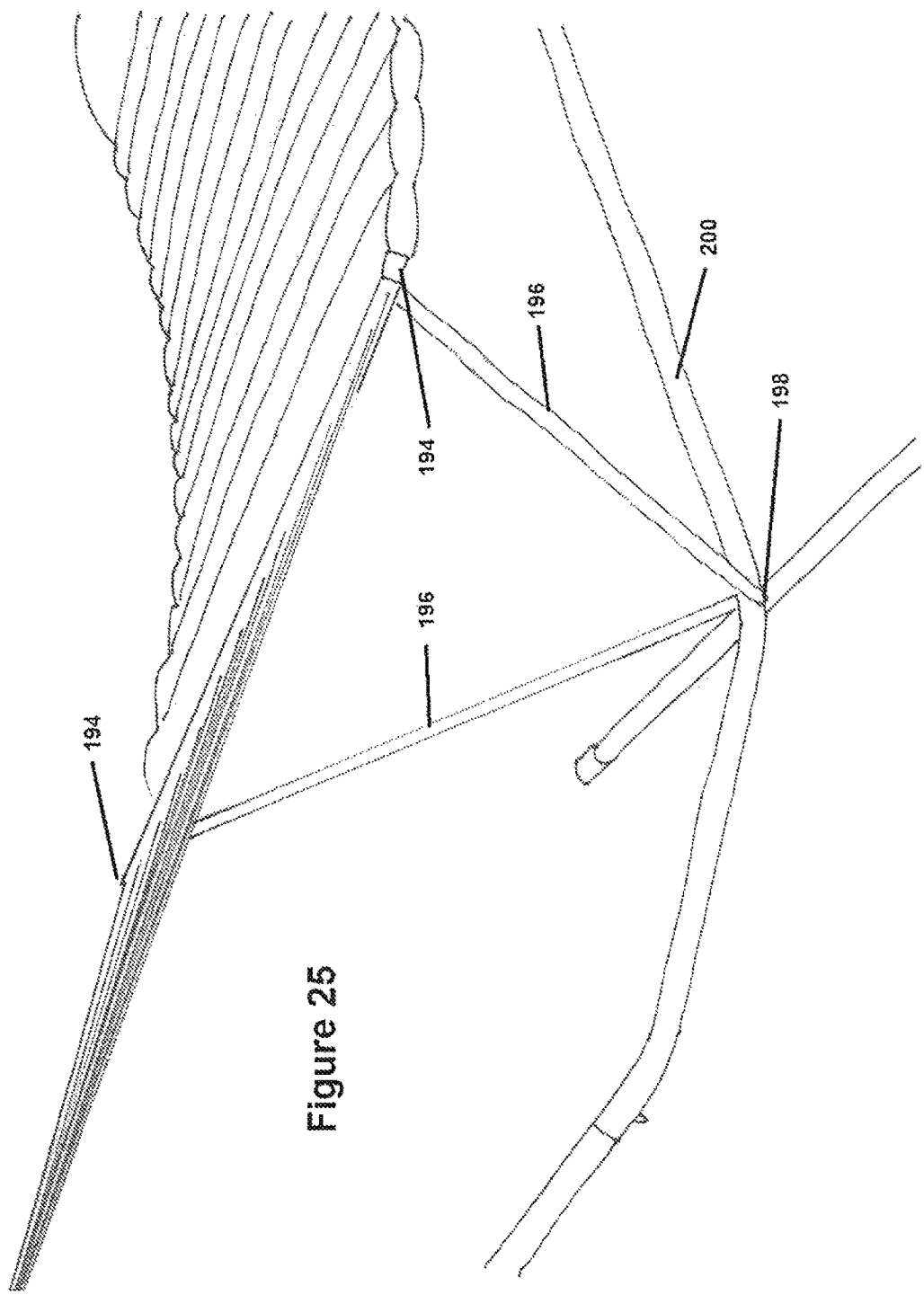
FIG. 25 is a detail perspective view of a no-flip hammock strap attached to a universal porch mount, an upright arm and a wide hammock.

Referring also to FIG. 25, which shows detail of FIG. 23, shown are no-flip straps 196, attached to a hammock corner 194 and anchored to a structure 198 on the hammock stand 200.

Figure 26:
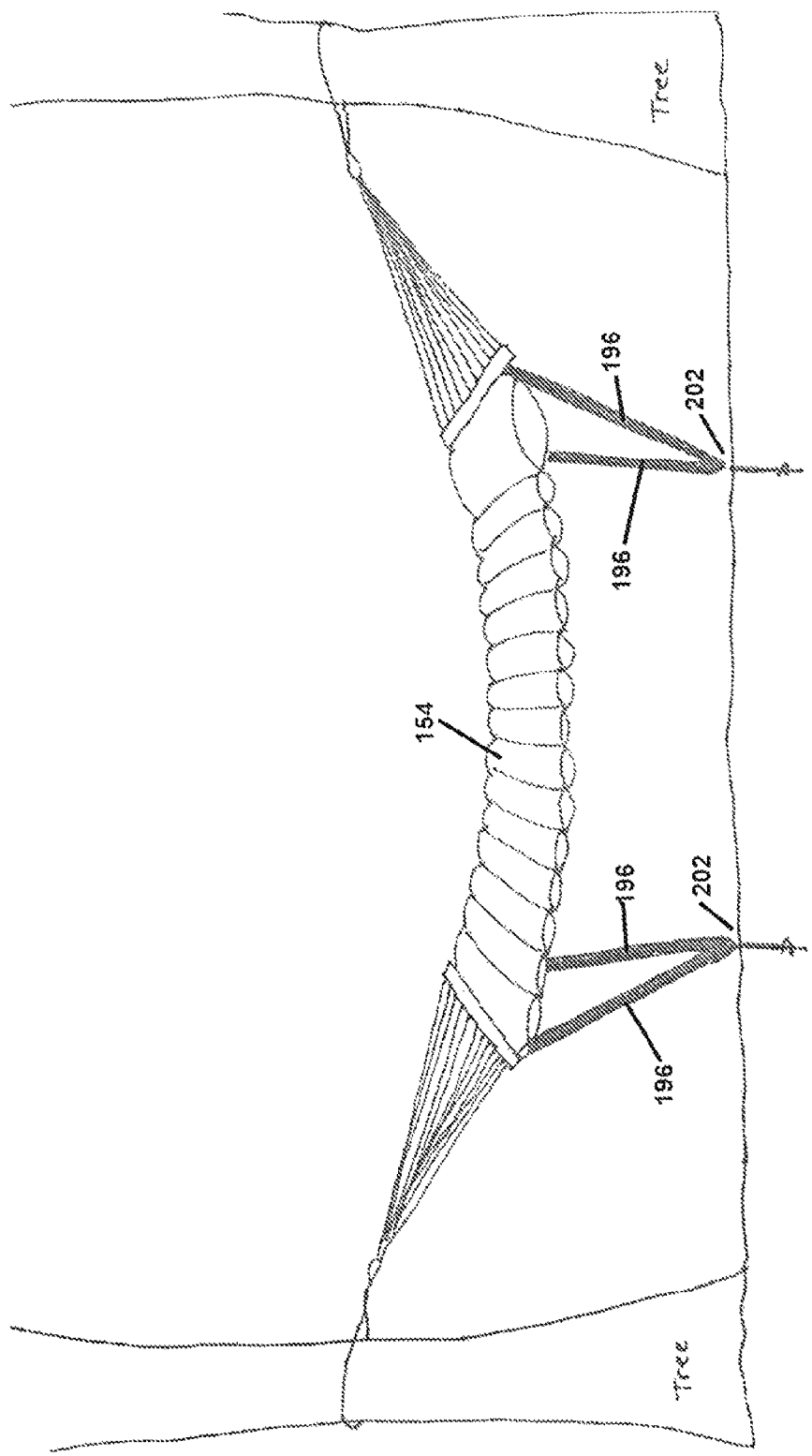
FIG. 26 is a perspective view of a wide hammock supported by a tree and with no-flip hammock straps.
Figure 27:
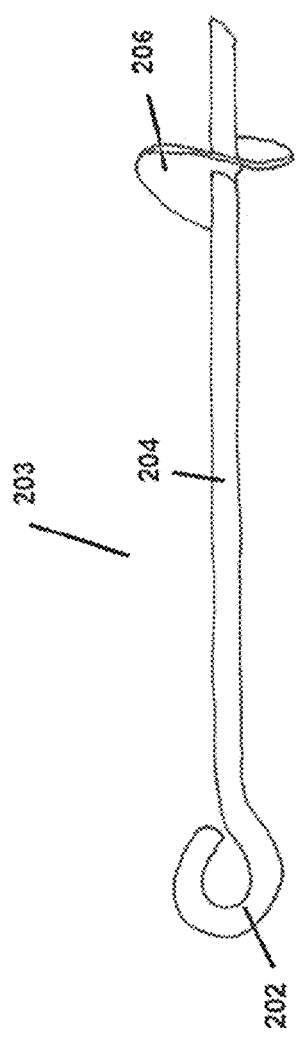
FIG. 27 shows pegs for attachment of no-flip hammock straps.

FIG. 26 shows a wide hammock 154 suspended between two trees. The no-flip hammock straps 196 extend from hammock corners, to anchor points 202 on the ground, which may be natural or artificial immovable objects. Pegs and stakes can be used. FIG. 27 shows an anchor peg 203 that can be screwed into the ground, comprising an anchor point or hook 202, peg body 204, and screw anchor 206. The anchor may be screwed into dirt, grass, sand, etc., by screwing the end with the thread fit into the dirt, grass, sand, etc. . . . . The no-flip hammock strap attaches to the attachment 202 and extends to the corners to corners of the hammock.

Infinite Adjustment

Turning to FIG. 28, an infinite adjustment is shown. The infinite adjustment may be used for adjusting the length of a cord or rope component of a chair or hammock. For example, a hanging chair with three support cords for the chair/footrest, which are conventionally adjusted by tying and untying knots. The infinite permits an easy adjustment that will secure infinite adjustments at three points on the chair/footrest assembly. The infinite adjustment is also beneficial for adjusting height when changing from the double chair hitch mount configuration to the porch configuration or vice versa. The infinite adjustment 220 comprises a plate 222 of any suitable material, such as metal with apertures through which the cord 224 passes. The cord 224 passes through an aperture 226, loops around an attachment and back through the other aperture 226, where it is secured by a knot. Where the apertures 226 are round, the infinite adjustment is similar to tent cord adjustment systems. The infinite adjustment feature can differ by shaping the aperture to lock more securely on the cord 224. This includes slots into which the cord 224 is pulled and compressed (FIGS. 29a, 29c) or teeth or points that grab the cord 224 (FIG. 29b). The infinite adjustment may be made of stamped metal, however it may also be made of plastic or a composite. At or near ends may be found oval sharp ends.

Note that the parts and configurations described are advantageous for travel, with parts easily coming apart from each other, parts easily locking and unlocking, and easy assembly and disassembly. Furthermore, the parts have dimensions that make them store easily together in a bag. The parts are relatively lightweight, so that transporting, lifting, setting up, and taking down do not require multiple hands or extra strength. Each part may be made of aluminum, steel, plastic, or a composite of one or more materials to achieve an optimal lightweight strength. Embodiments include a type of lower upright base that may be used for a standalone hammock support structure. Using the same middle uprights and upper uprights that are used for the hitch trailer, a standalone alternative is also possible. This creates a versatile use of a hammock for whatever the occasion. Also, this is an efficient use of parts, allowing parts to be reused, which results in less storage space required and also less cargo space required for times of travel.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A vehicle mounted seating system that is convertible between a hammock supporting configuration and a chair supporting configuration comprising:
   a hammock for use as a bed;
   a hanging chair;
   a base hitch mount configured to mount upon a vehicle tow hitch;
   a vertical member fixed to the mount, the vertical member configured with two vertical mounting structures;
   two elongated curved arms, each arm having a first end and a second end, each arm having a first portion adjacent the first end, and a second portion near the second end, each arm being straight or curved in the first portion and being more curved in the second portion than in the first portion;
   two hangers, each hanger attachable to either the first or second end of the arms respectively, and configured to interchangeably suspend the hanging chair or the hammock, each arm being configurable for interchangeable attachment to the hangers or the mounting structures, thereby allowing the system to be alternatively assembled and therefore convertible between the hammock supporting configuration and the chair supporting configuration;
   wherein in the chair supporting configuration at least one of the arms is mounted to the vertical member by attaching the first end of the at least one arm to one of the vertical mounting structures, one of the hangers is attached to the second end of the at least one arm, and the hanging chair is attached to the one hanger, the at least one arm extending in a substantially vertical direction and curving outwardly to provide ground clearance for support of the hanging chair suspended from the one hanger, the second end of the at least one arm positioned at a first height with respect to the ground, and a curvature of the at least one arm provides horizontal displacement of the handing chair from the at least one arm to prevent interference from the at least one arm during use of the hanging chair;

wherein alternatively, in the hammock supporting configuration, each of the arms are attached via the second ends of the arms to the vertical mounting structures respectively, the hangers are attached to the first ends of the arms respectively, the arms extending in opposing substantially horizontal directions and the hammock attached to each of the hangers and suspended therefrom, the first ends of the arms positioned at a second height with respect to the ground wherein the second height is less than the first height, the curvature of the arms providing horizontal displacement for the hammock to prevent interference from the arms during use of the hammock.

2. The system of claim 1 wherein the arms are assembled to support the hanging chair.

3. The system of claim 1 wherein the arms are assembled to support the hammock.

4. The system of claim 1 wherein each arm includes at least one joinder to allow disassembly and reassembly of each arm into separate parts.

5. The system of claim 4 wherein the at least one joinder is provided between the first and second portions of each arm respectively.

6. The system of claim 1, wherein a total curvature over a full length of each arm between the first and second ends is at least 90 degrees.

7. A vehicle mounted seating system that is convertible between a hammock supporting configuration and a chair supporting configuration comprising:
   a hammock for use as a bed;
   two hanging chairs;
   a base hitch mount configured to mount upon a vehicle tow hitch;
   a vertical member fixed to the mount, the vertical member configured with two vertical mounting structures;
   two elongated curved arms, each arm having a first end and a second end, each arm having a first portion adjacent the first end, and a second portion near the second end, each arm being straight or curved in the first portion and being more curved in the second portion than in the first portion;
   two hangers, each hanger attachable to either the first or second end of the arms respectively, and configured to interchangeably suspend the hanging chairs or the hammock, each arm being configurable for interchangeable attachment to the hangers or the mounting structures, thereby allowing the system to be alternatively assembled and therefore convertible between the hammock supporting configuration and the chair supporting configuration;
   wherein in the chair supporting configuration the arms are mounted to the vertical member by attaching the first end of each arm to one of the vertical mounting structures respectively, each hanger is respectively attached to the second ends of the arms, and the hanging chairs are respectively attached to each hanger, the arms extending in a substantially vertical direction and curving outwardly to provide ground clearance for support of the hanging chairs suspended from the hangers, the second ends of the arms positioned at a first height with respect to the around, and a curvature of the arms provides horizontal displacement of the hanging chairs from the arms to prevent interference from the arms during use of the hanging chairs;
   wherein alternatively, in the hammock supporting configuration, each of the arms are attached via the second ends of the arms to the vertical mounting structures respectively, the hangers are attached to the first ends of the arms respectively, the arms extending in opposing substantially horizontal directions and the hammock attached to each of the hangers and suspended therefrom, the first ends of the arms positioned at a second height with respect to the ground wherein the second height is less than the first height, the curvature of the arms providing horizontal displacement for the hammock to prevent interference from the arms during use of the hammock.

* * * * *